Jan. 2, 1962 F. E. DOBSON ET AL 3,015,155
APPARATUS FOR ASSEMBLING AEROSOL VALVES
Filed April 16, 1957 23 Sheets-Sheet 1

FIG. I

INVENTORS
FRANK E. DOBSON
THEODORE J. A. MANVELL
BY
ATTORNEYS

Jan. 2, 1962 F. E. DOBSON ET AL 3,015,155
APPARATUS FOR ASSEMBLING AEROSOL VALVES
Filed April 16, 1957 23 Sheets-Sheet 2

INVENTORS
FRANK E. DOBSON
THEODORE J.A. MANVELL
BY
Charles H. Cline
Leland R. McLain
George W. Reiber
ATTORNEYS

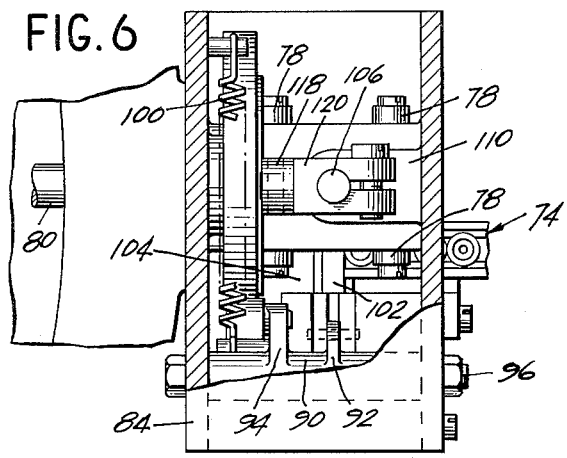
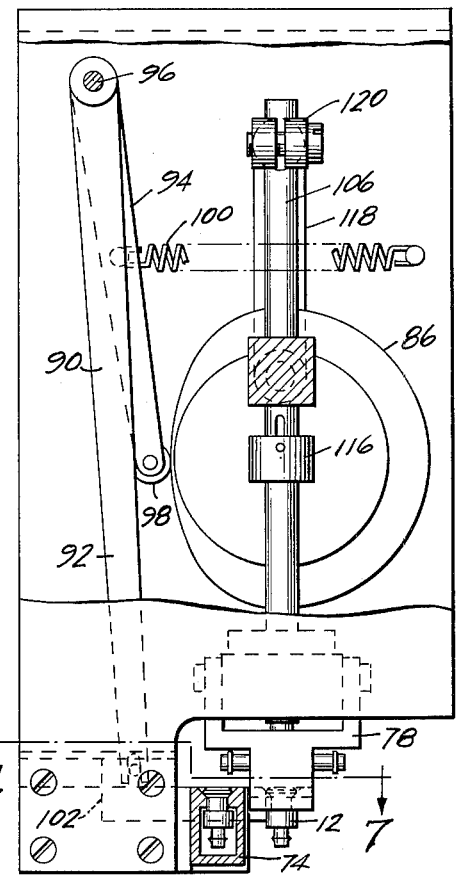
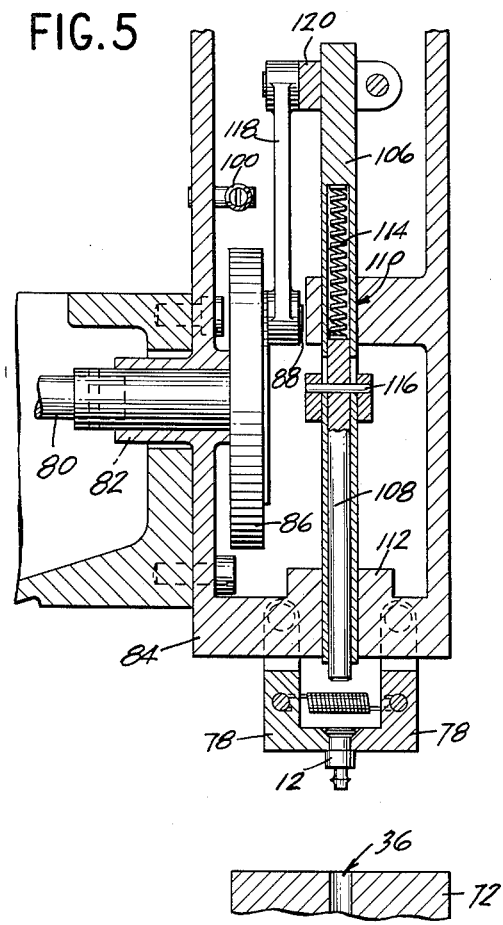

Jan. 2, 1962  F. E. DOBSON ET AL  3,015,155
APPARATUS FOR ASSEMBLING AEROSOL VALVES
Filed April 16, 1957  23 Sheets-Sheet 4

INVENTORS
FRANK E. DOBSON
THEODORE J. A. MANVELL
BY
ATTORNEYS

FIG.10
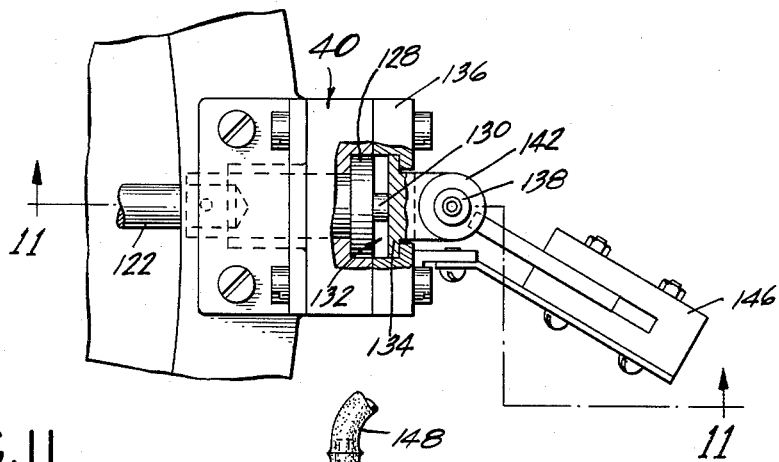
FIG.11
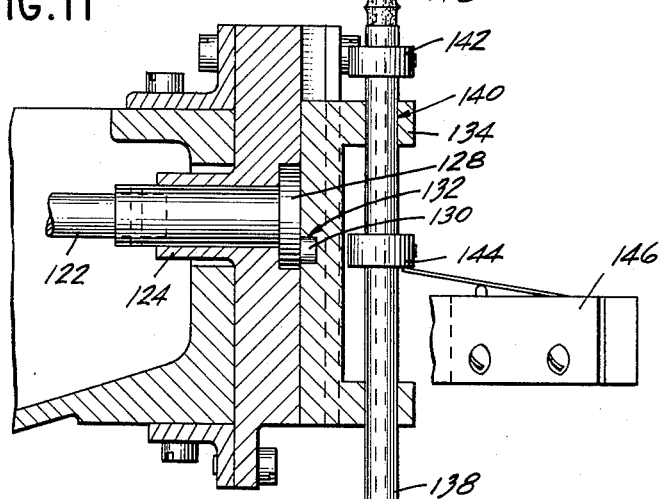
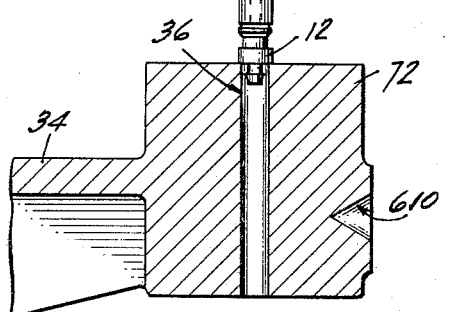
INVENTORS
FRANK E. DOBSON
THEODORE J.R. MANVELL
ATTORNEYS Jan. 2, 1962     F. E. DOBSON ET AL     3,015,155
APPARATUS FOR ASSEMBLING AEROSOL VALVES
Filed April 16, 1957     23 Sheets-Sheet 6
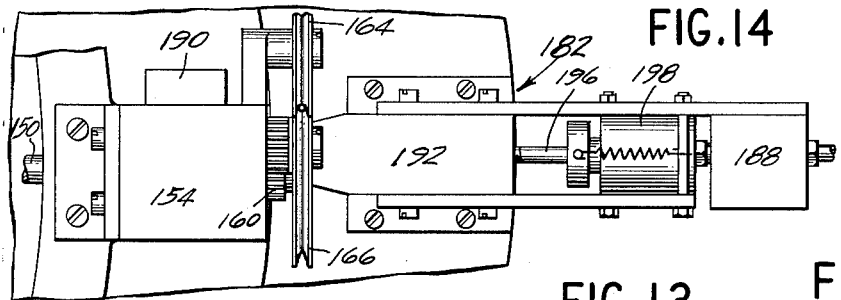
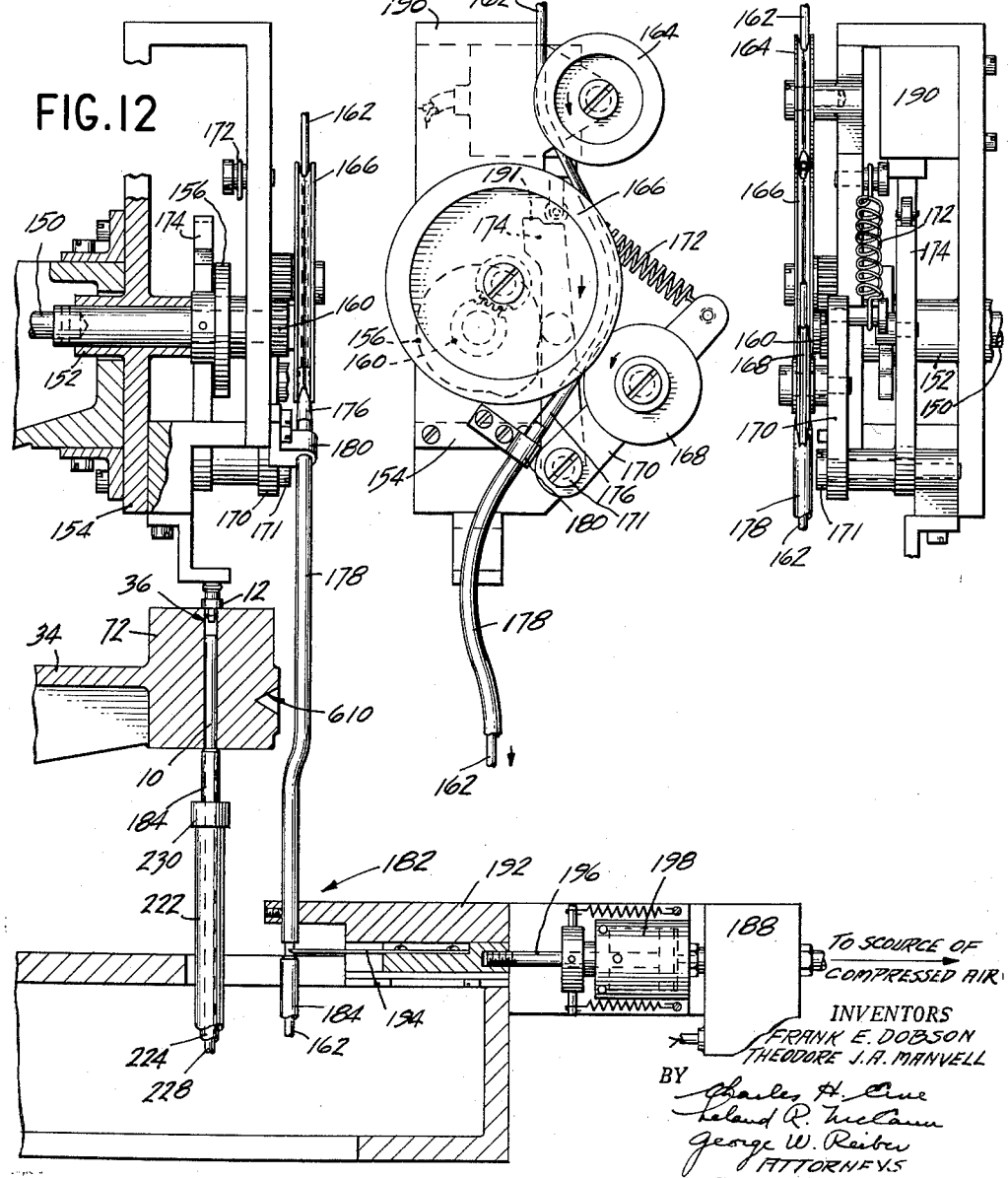
INVENTORS
FRANK E. DOBSON
THEODORE J. A. MANVELL
BY
ATTORNEYS

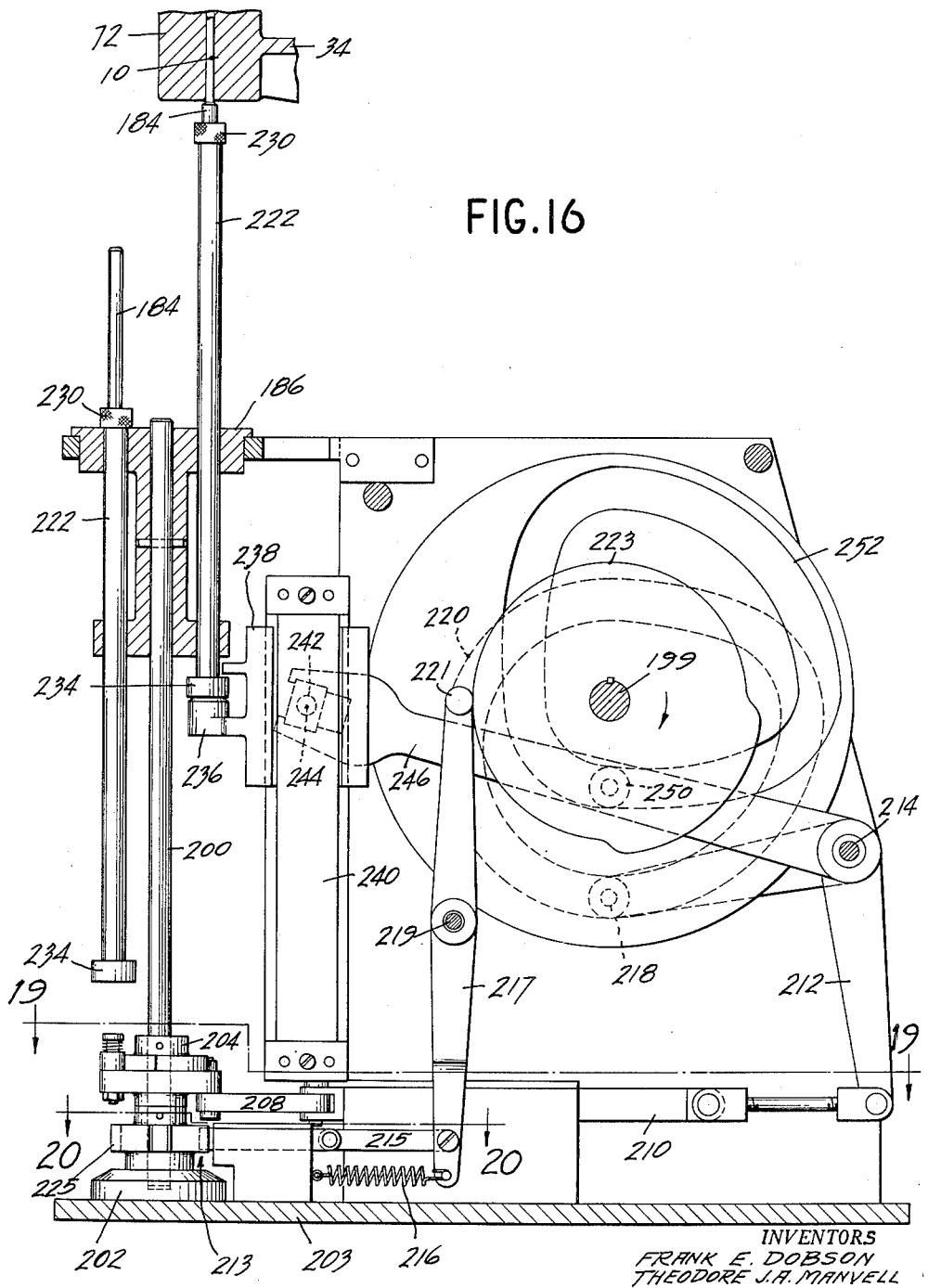

Jan. 2, 1962     F. E. DOBSON ET AL     3,015,155

APPARATUS FOR ASSEMBLING AEROSOL VALVES

Filed April 16, 1957     23 Sheets-Sheet 8

INVENTORS
FRANK E. DOBSON
THEODORE J. A. MANVELL
BY
ATTORNEYS

INVENTORS
FRANK E. DOBSON
THEODORE J. A. MANVELL
BY
ATTORNEYS

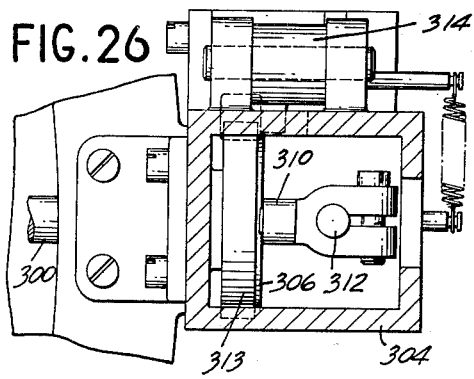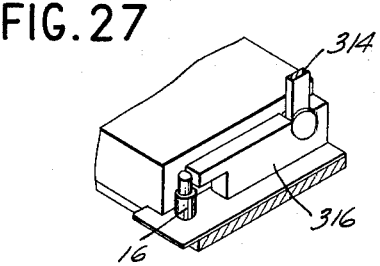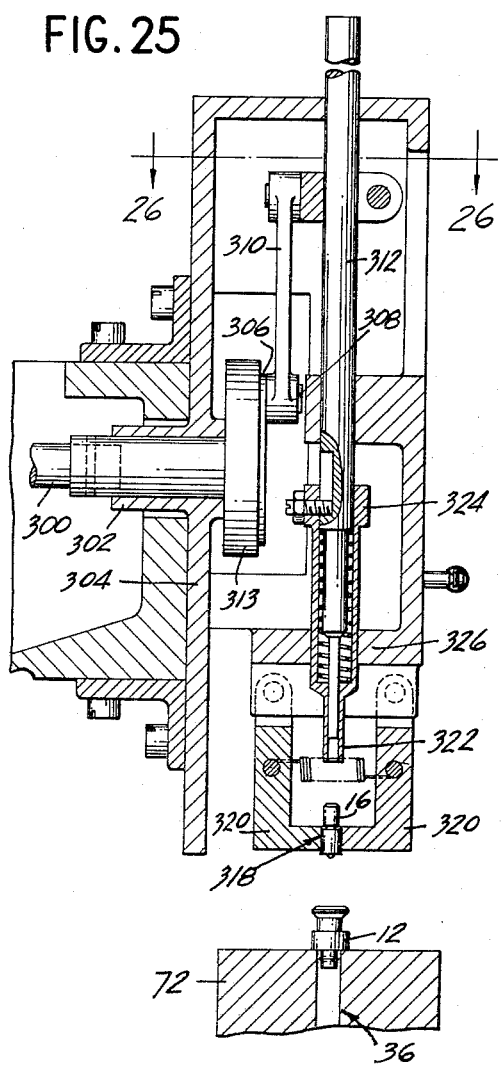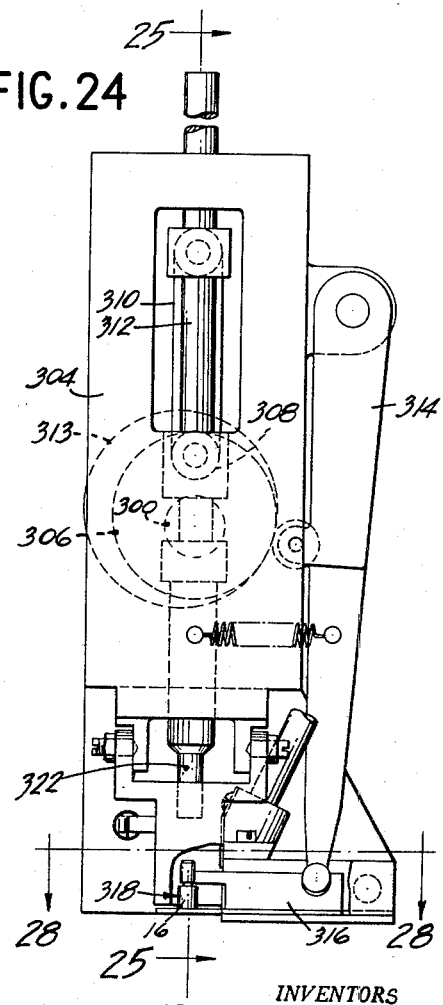

Jan. 2, 1962   F. E. DOBSON ET AL   3,015,155
APPARATUS FOR ASSEMBLING AEROSOL VALVES
Filed April 16, 1957   23 Sheets-Sheet 11

INVENTORS
FRANK E. DOBSON
THEODORE J.A. MANVELL
BY Charles H. Cue
Leland R. McCann
George W. Reiter
ATTORNEYS

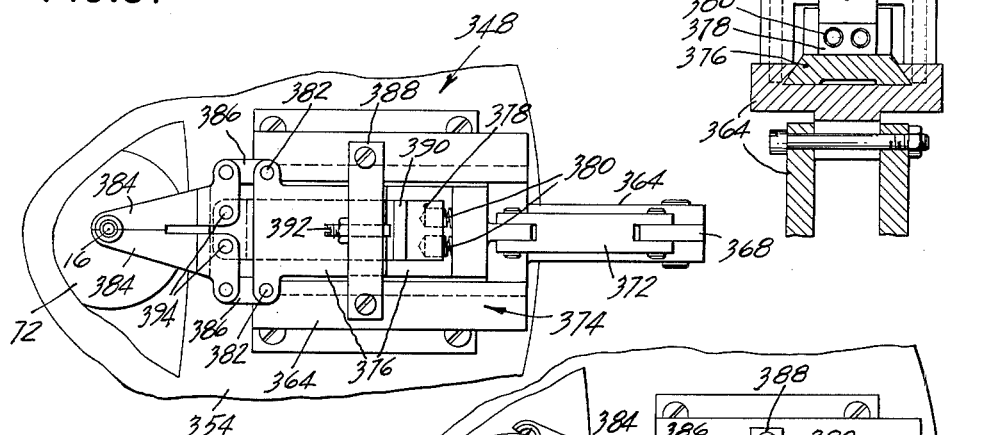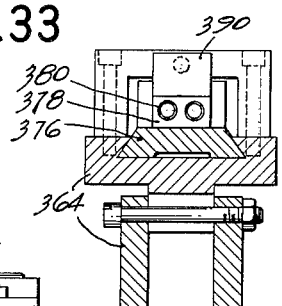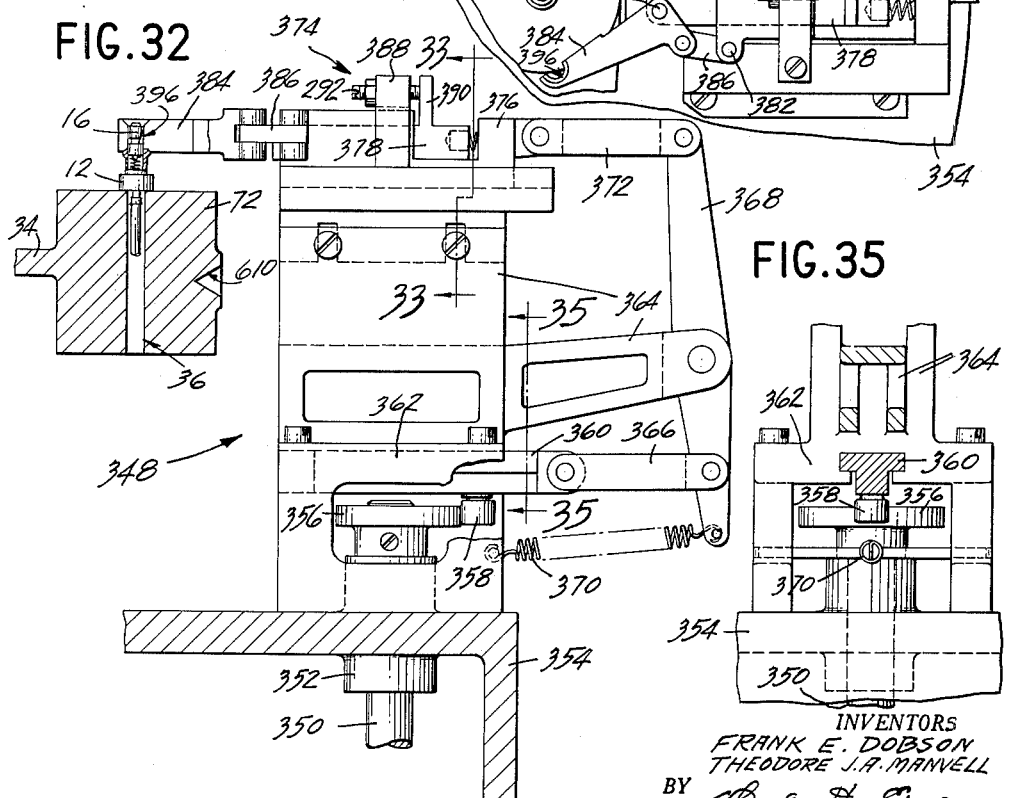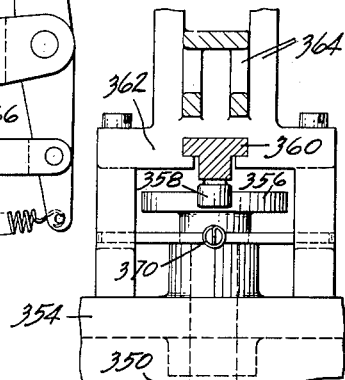

Jan. 2, 1962 F. E. DOBSON ET AL 3,015,155
APPARATUS FOR ASSEMBLING AEROSOL VALVES
Filed April 16, 1957 23 Sheets-Sheet 13

INVENTORS
FRANK E. DOBSON
THEODORE J.A. MANVELL
BY
ATTORNEYS

INVENTORS
FRANK E. DOBSON
THEODORE J.A. MANVELL
BY Charles H. Cruse
Leland R. McCann
George W. Reiber
ATTORNEYS Jan. 2, 1962   F. E. DOBSON ET AL   3,015,155
APPARATUS FOR ASSEMBLING AEROSOL VALVES
Filed April 16, 1957   23 Sheets-Sheet 15

INVENTORS
FRANK E. DOBSON
THEODORE J.A. MANVELL
BY
ATTORNEYS

Jan. 2, 1962   F. E. DOBSON ET AL   3,015,155
APPARATUS FOR ASSEMBLING AEROSOL VALVES
Filed April 16, 1957   23 Sheets-Sheet 16

INVENTORS
FRANK E. DOBSON
THEODORE J. A. MANVELL
BY
Charles H. Cue
Leland R. McCann
George W. Reiter
ATTORNEYS

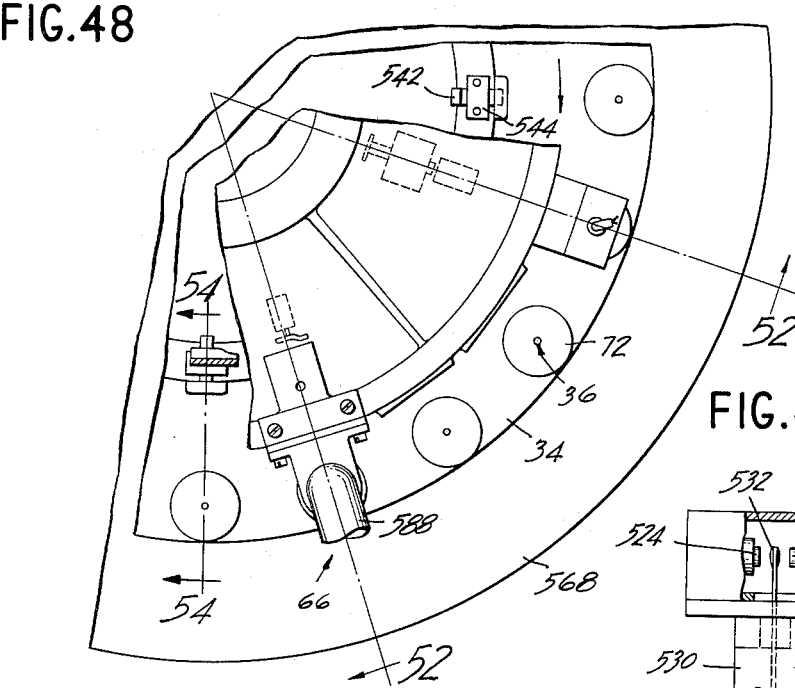
FIG.48
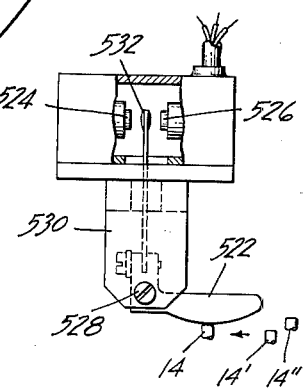
FIG.49
FIG.50
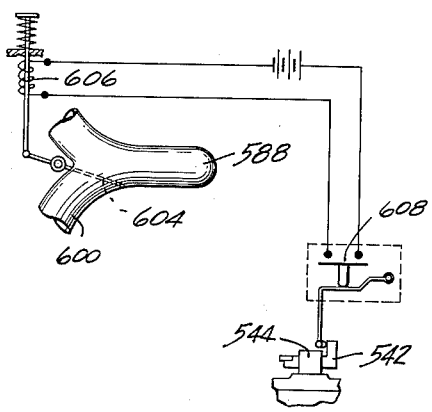
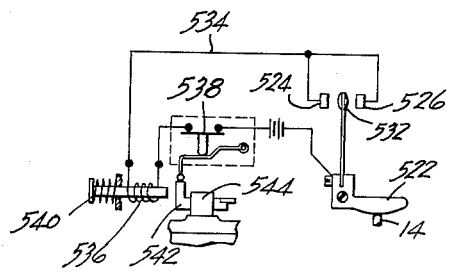
FIG.51

Jan. 2, 1962  F. E. DOBSON ET AL  3,015,155
APPARATUS FOR ASSEMBLING AEROSOL VALVES
Filed April 16, 1957  23 Sheets-Sheet 18

INVENTORS
FRANK E. DOBSON
THEODORE J.A. MANVELL
BY
ATTORNEYS

Jan. 2, 1962 F. E. DOBSON ET AL 3,015,155
APPARATUS FOR ASSEMBLING AEROSOL VALVES
Filed April 16, 1957 23 Sheets-Sheet 19

INVENTORS
FRANK E. DOBSON
THEODORE J.A. MANVELL
BY Charles H. Cone
Leland R. McCann
George W. Reiter.
ATTORNEYS Jan. 2, 1962 F. E. DOBSON ET AL 3,015,155
APPARATUS FOR ASSEMBLING AEROSOL VALVES
Filed April 16, 1957 23 Sheets-Sheet 20

INVENTORS
FRANK E. DOBSON
THEODORE J.A. MANVELL
BY
*Charles H. Cone*
*Leland R. McLean*
*George W. Reiter*
ATTORNEYS

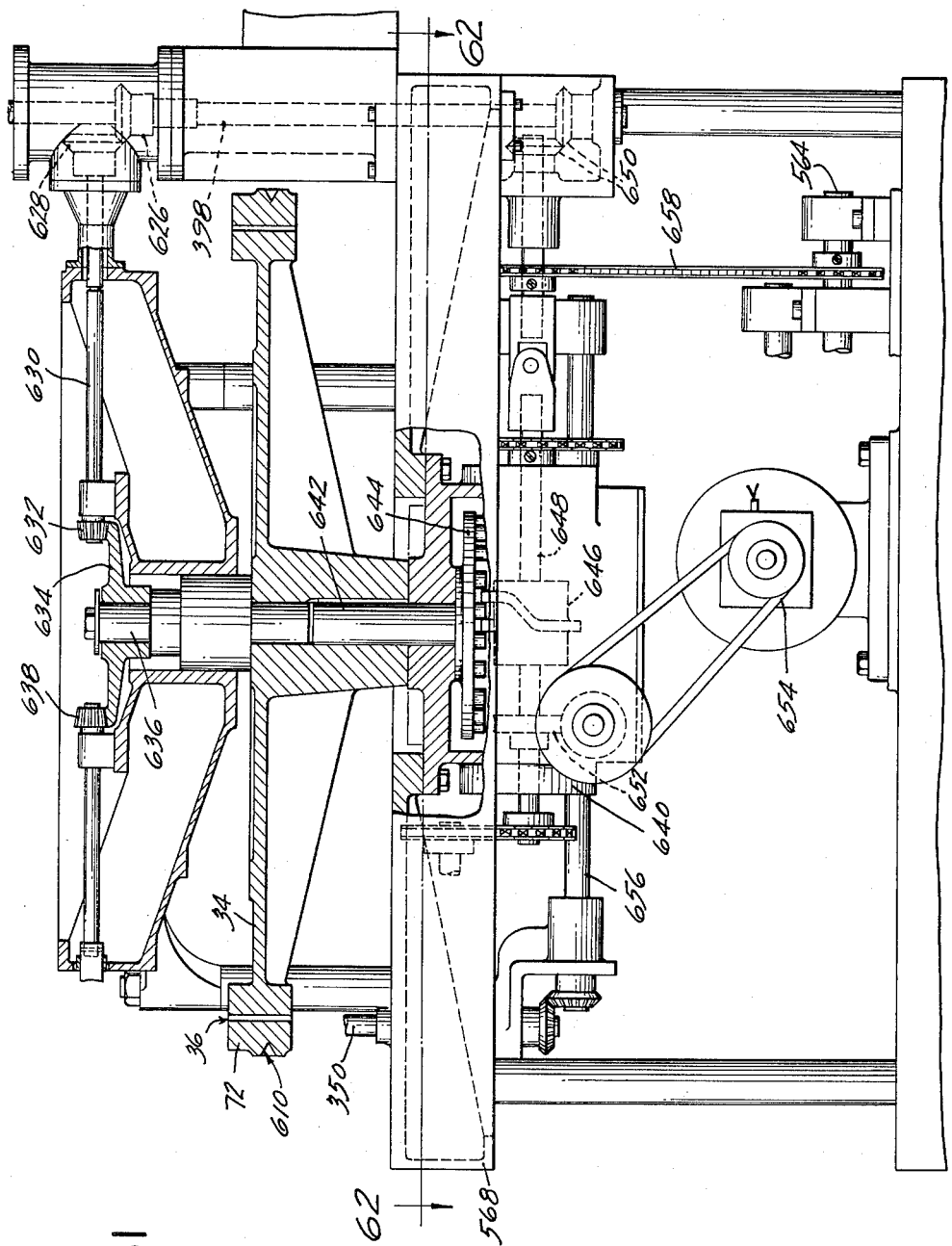

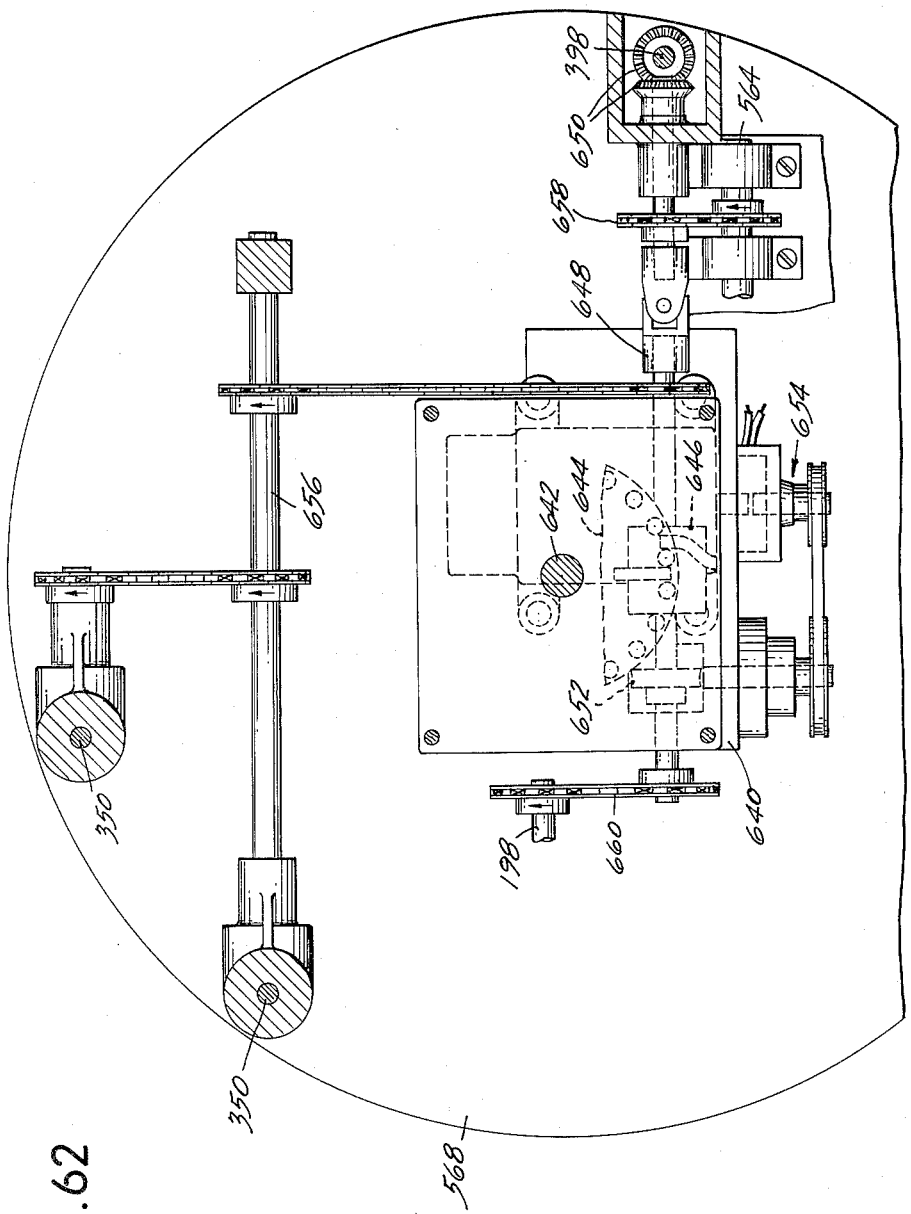

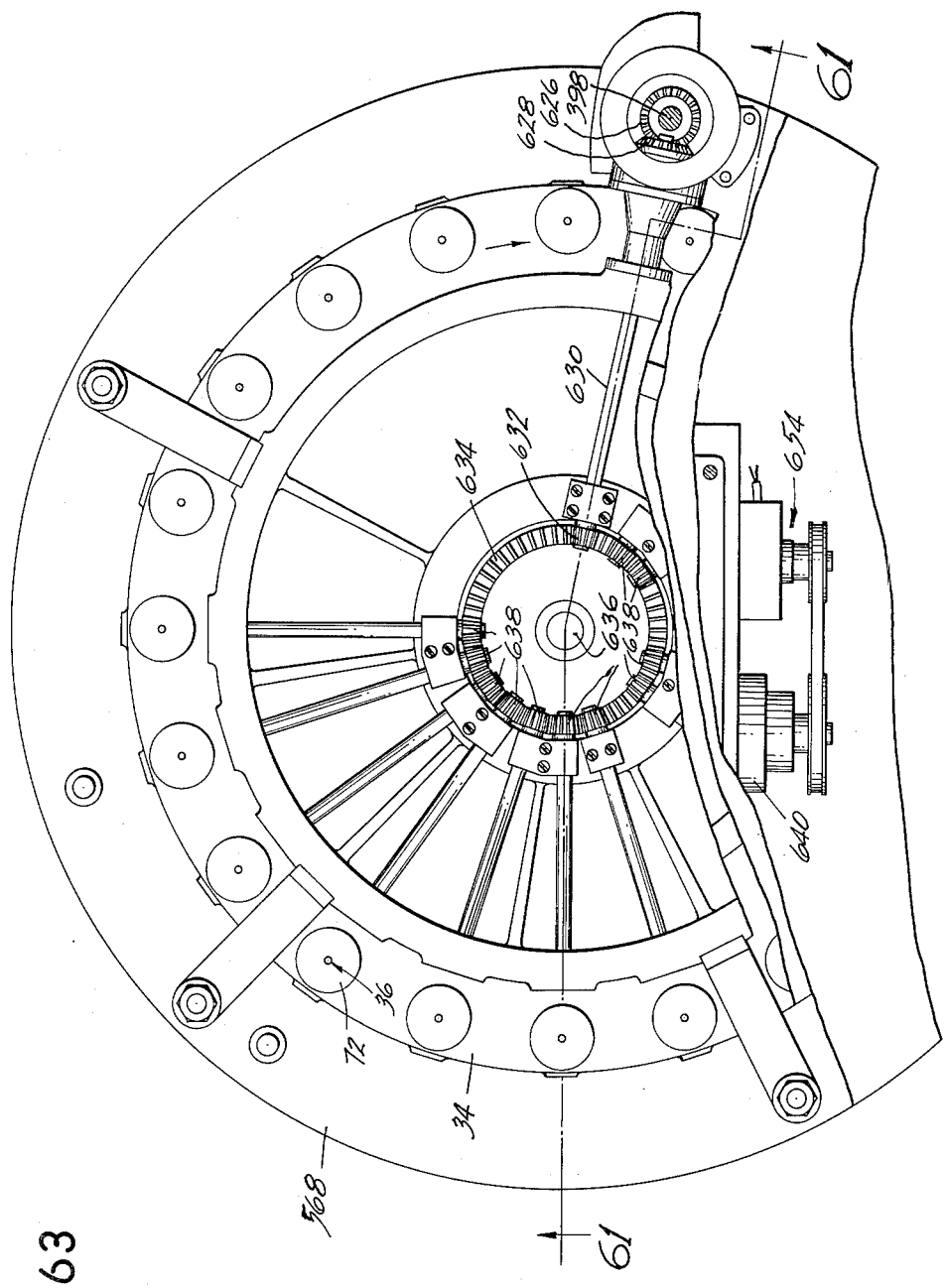

United States Patent Office 3,015,155
Patented Jan. 2, 1962

3,015,155
APPARATUS FOR ASSEMBLING AEROSOL
VALVES
Frank E. Dobson, Newark, and Theodore J. A. Manvell, Nutley, N.J., assignors, by mesne assignments, to American Can Company, New York, N.Y., a corporation of New Jersey
Filed Apr. 16, 1957, Ser. No. 653,083
26 Claims. (Cl. 29—211)

The present invention relates to a machine for manufacturing aerosol valves commonly used in spray type containers for insecticides and many other products and has particular reference to a machine which assembles the various parts of the valve and secures them together as a unitary structure.

In the manufacture of spray type containers, various constructions of aerosol valves are utilized, but in a conventional form, such a valve comprises some seven or more parts, many of which are rather small and difficult to handle. For the most part, these valves are assembled by hand and thus require considerable labor, resulting in slow production and high costs and often high rejection rates due to inaccurate assembly of the parts.

An object of the instant invention is to provide an organized apparatus which assembles the various parts of the valve in proper relation and secures them together as a unitary structure, in an efficient, expeditious manner which results in high production at low cost and with accuracy which is unobtainable through manual assemblage.

Another object is to provide for the accurate and high speed handling and feeding of small valve parts in such a manner as to result in a proper assemblage of the parts to produce the unitary structure.

Another object is to provide for the handling and feeding of small fragile parts, many of which are made from plastic material, without breakage or distortion of the parts.

Another object is to provide, through novel feeding and handling mechanisms, for the fitting of small parts seriatim into coaxial relation and for the full control over such parts until the assemblage is completed and the various parts secured together.

Another object is to provide for the detection of each part as it is assembled with its related part so as to immediately detect an improper assemblage so that a correcton can be made instantly.

Another object is the provision of a novel staking mechanism which secures the various parts of the valve together to produce the unitary valve structure.

Numerous other objects and advantages of the invention will be apparent as it is better understood from the following description, which, taken in connection with the accompanying drawings, discloses a preferred embodiment thereof.

Referring to the drawings:

FIG. 4 is a front elevation of the body feed mechanism;

FIG. 5 is a sectional view along plane 5—5 of FIG. 4, in the direction of the arrows;

FIG. 6 is a top plan view of the mechanism shown in FIG. 4;

FIG. 10 is a top plan view of the detector mechanisms used at the several stations;

FIG. 11 is a sectional view of the detector mechanism taken along plane 11—11 in the direction of the arrows;

FIG. 12 is a sectional view of the tube feed mechanism;

FIG. 13 is a front view of the tube feed mechanism shown in FIG. 12;

FIG. 14 is a top plan view of the tube feed mechanism shown in FIG. 12;

FIG. 15 is a side view looking at FIG. 13 from the right hand side;

FIG. 16 is a partial sectional view of the loading portion of the tube feed mechanism;

Figure 19:
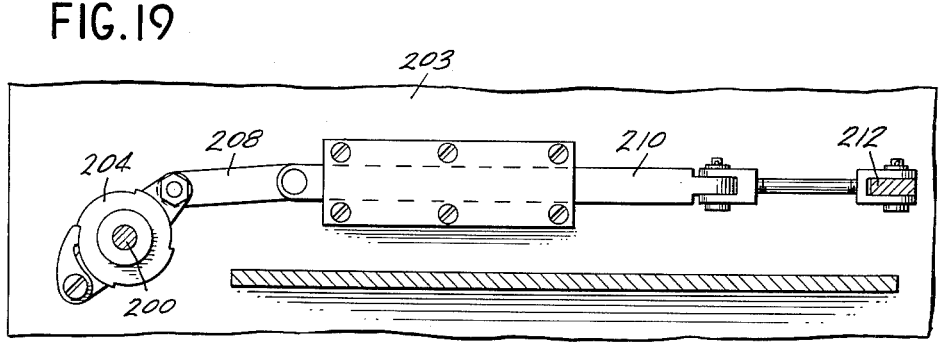
Figure 20:
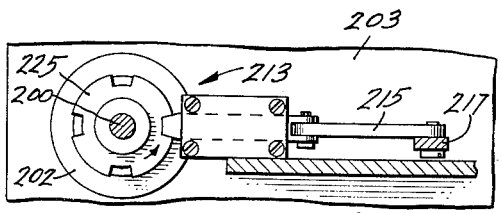
Figure 21:
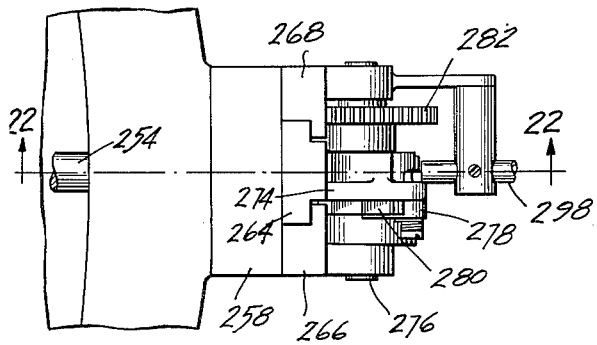
Figure 22:
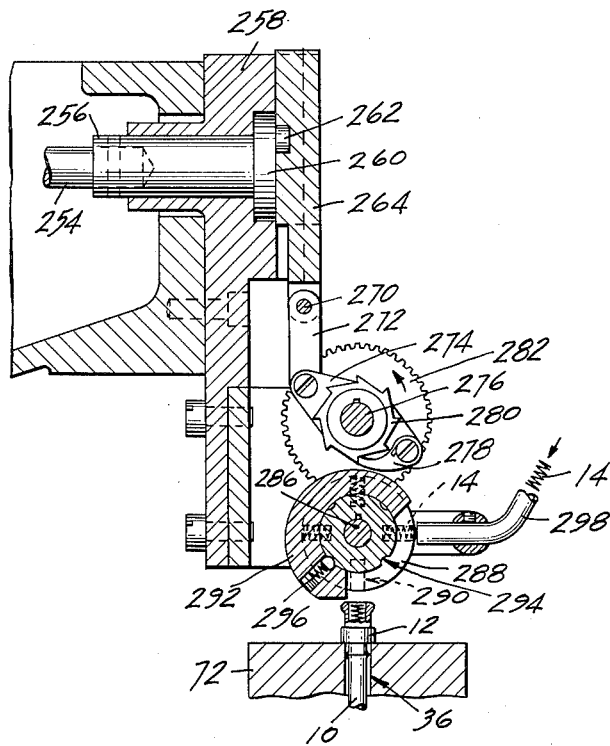
Figure 23:
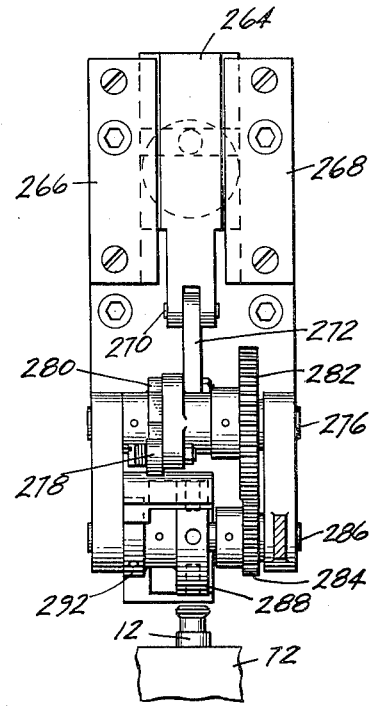
Figure 30:
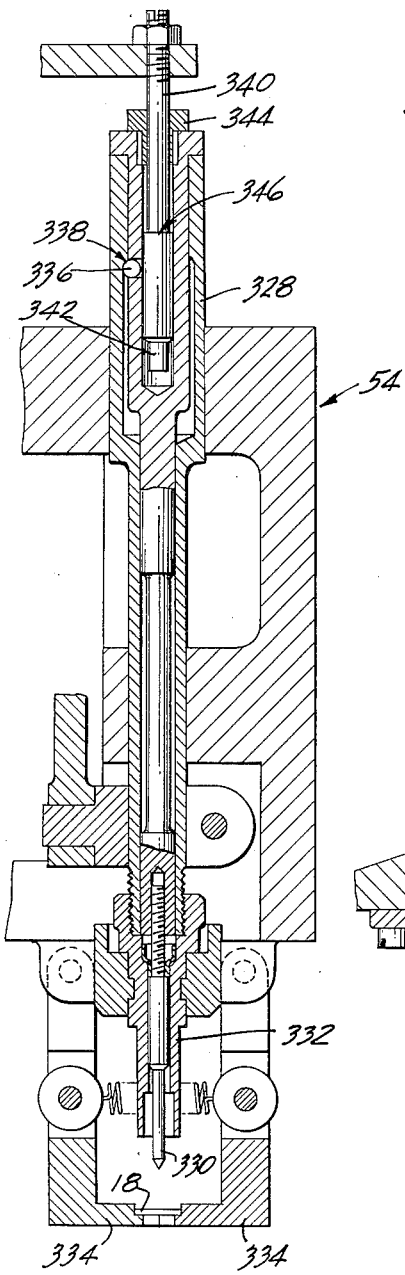
Figure 28:
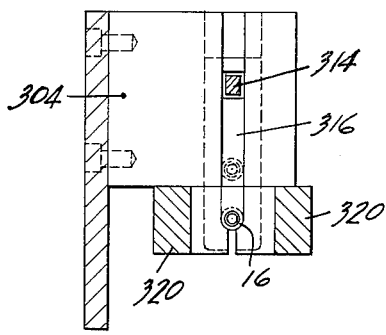
Figure 29:
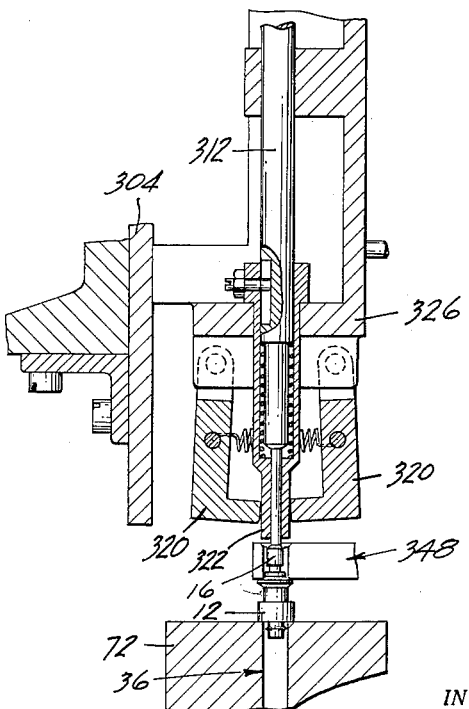
Figure 37:
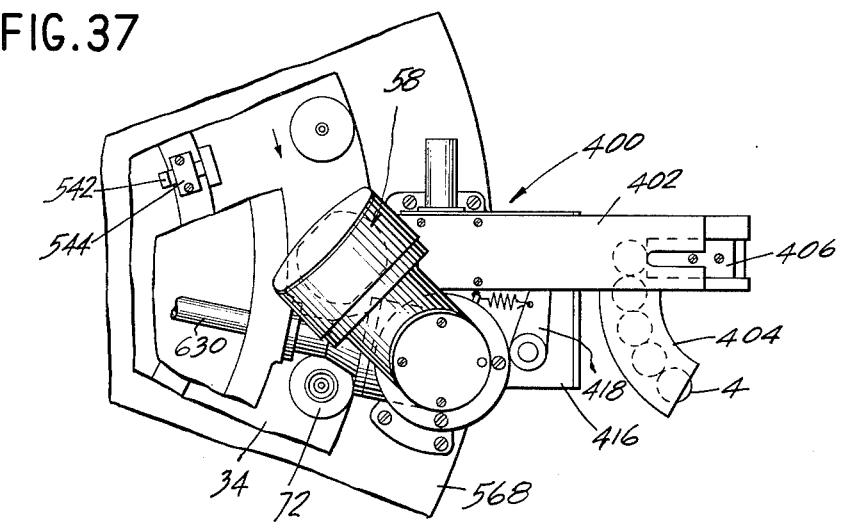
Figure 36:
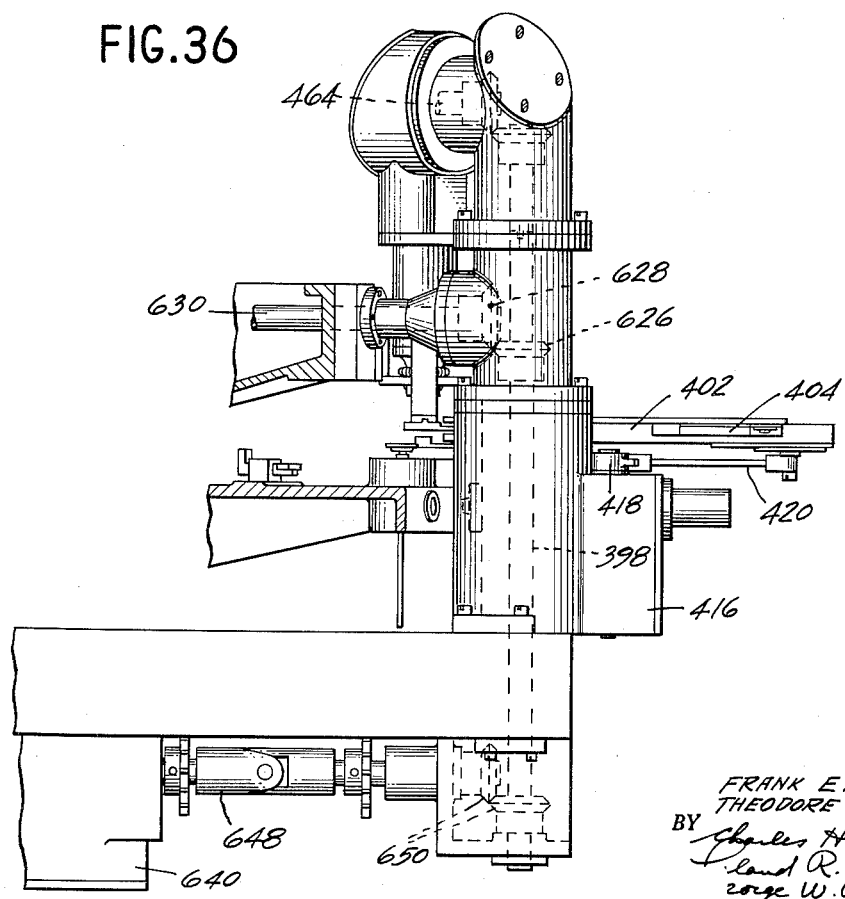
Figure 38:
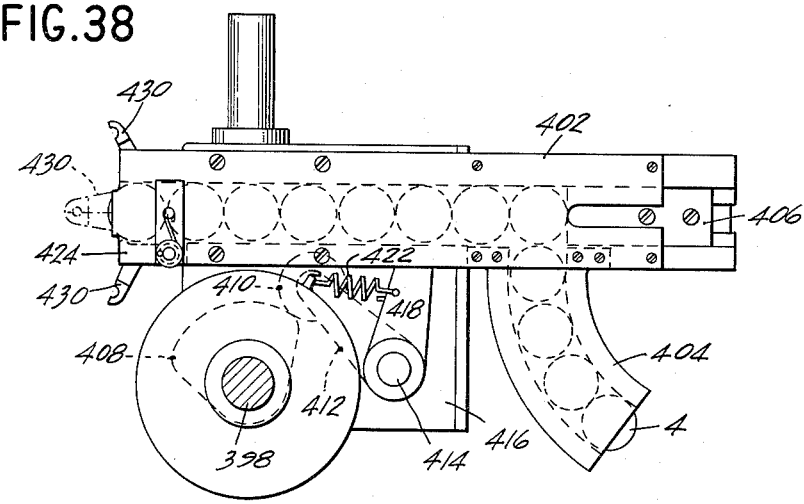
Figure 39:
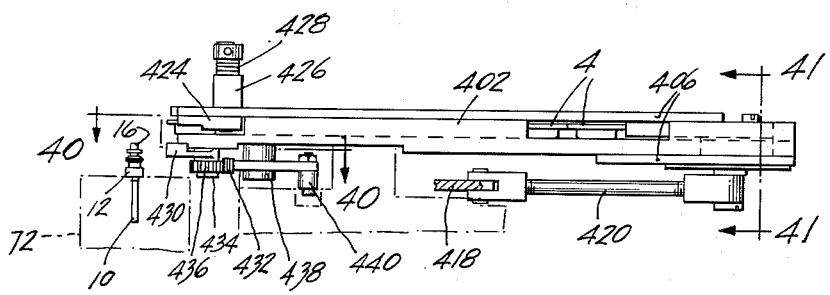
Figure 40:
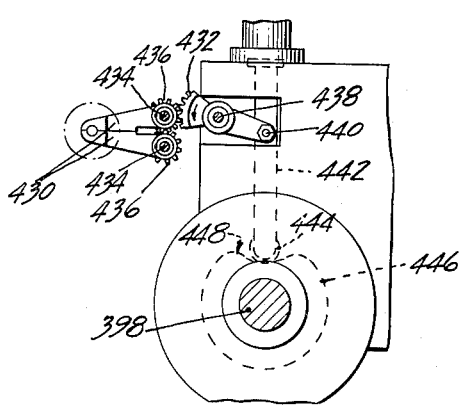
Figure 41:
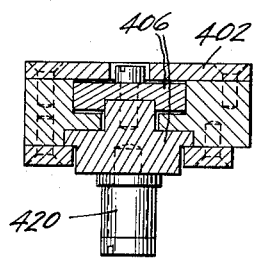
Figure 42:
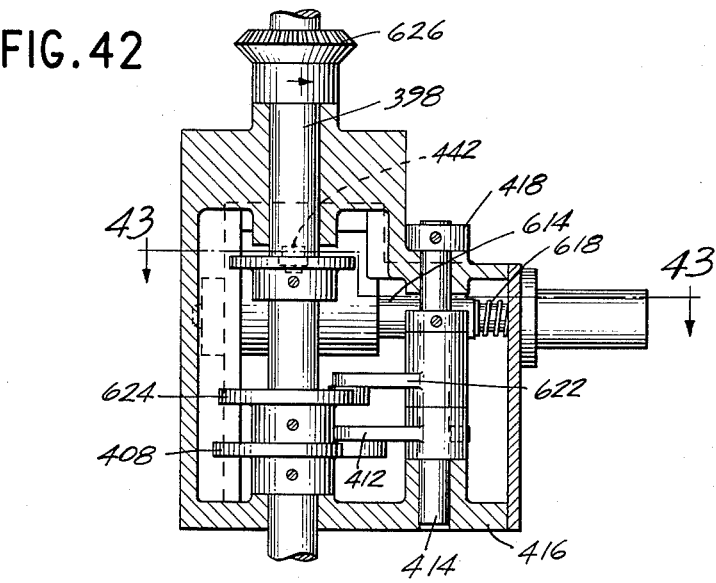
Figure 43:
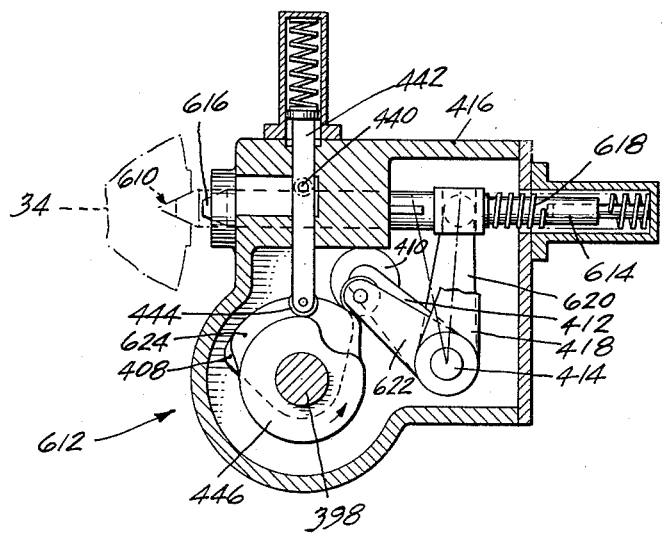
Figure 44:
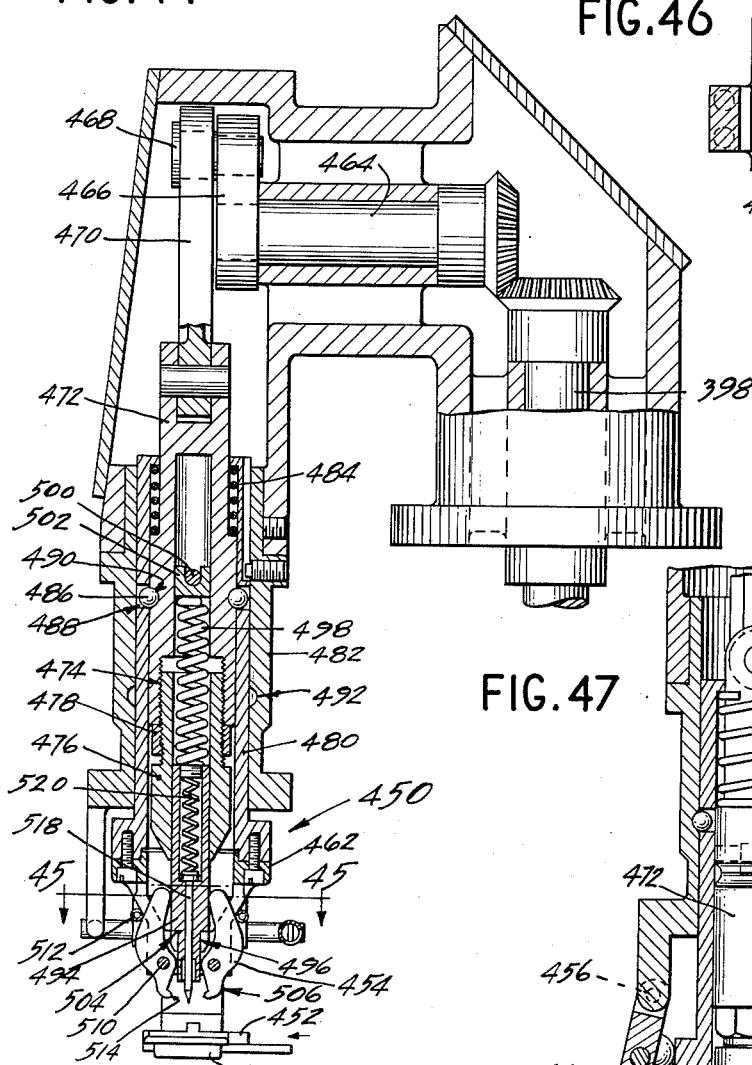
Figure 46:
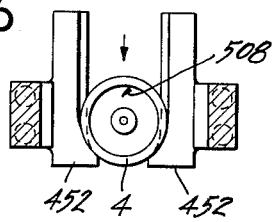
Figure 47:
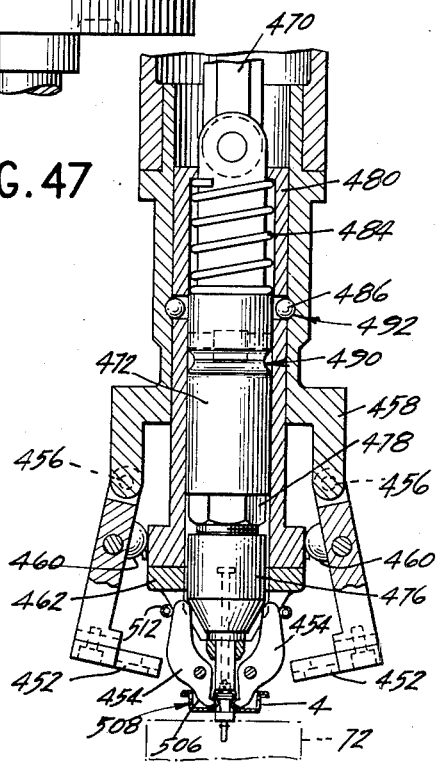
Figure 45:
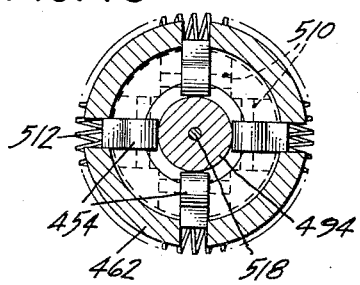
Figure 54:
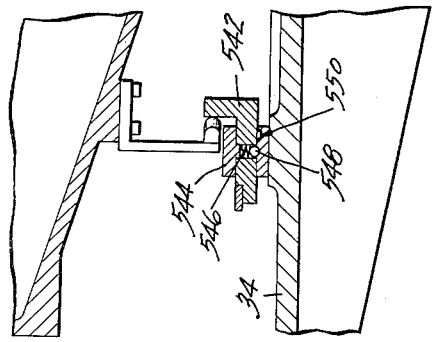
Figure 52:
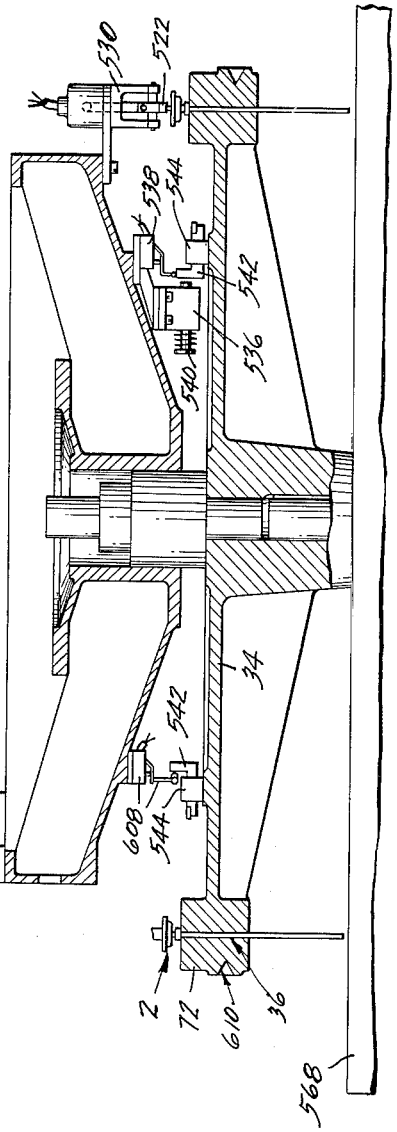
Figure 53:
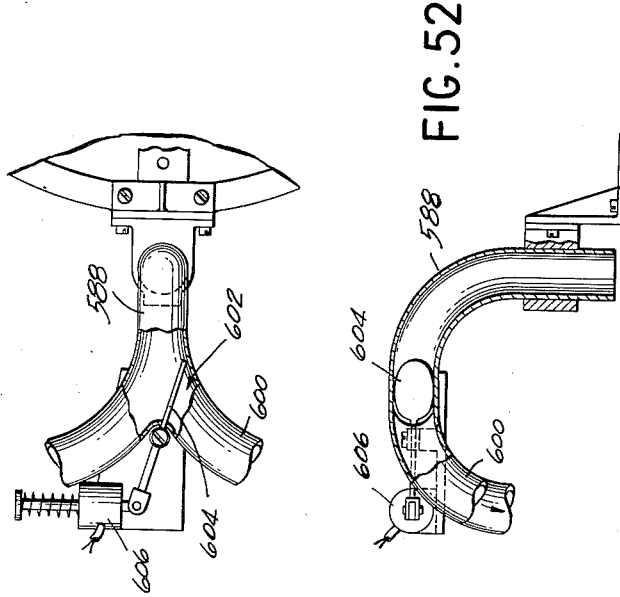
Figure 56:
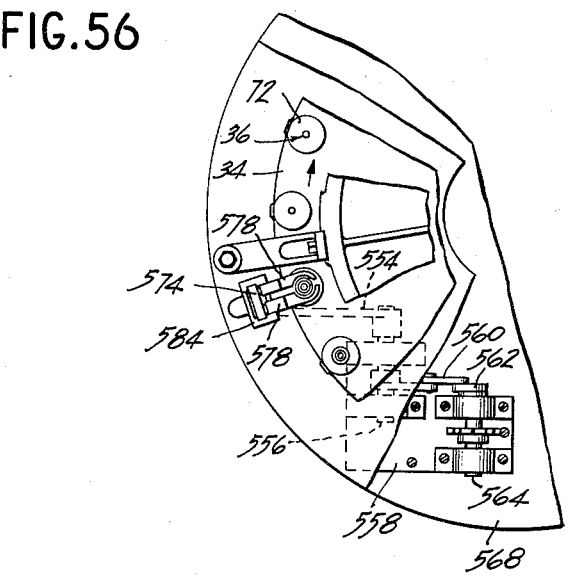
Figure 55:
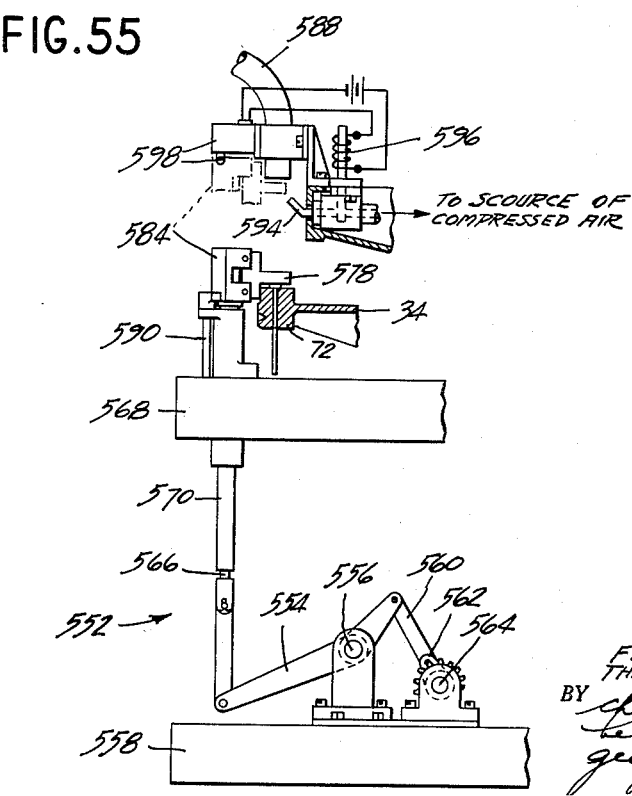
Figure 57:
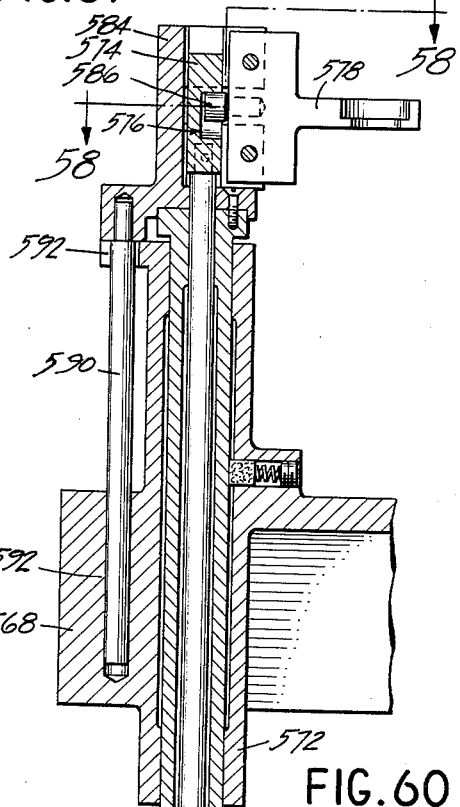
Figure 58:
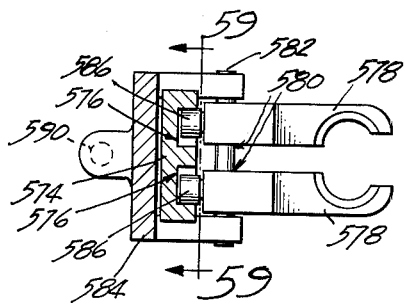
Figure 59:
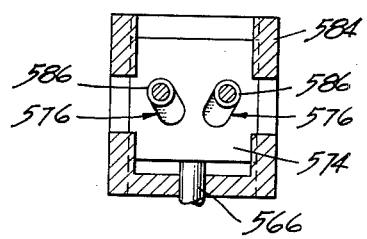
Figure 60:
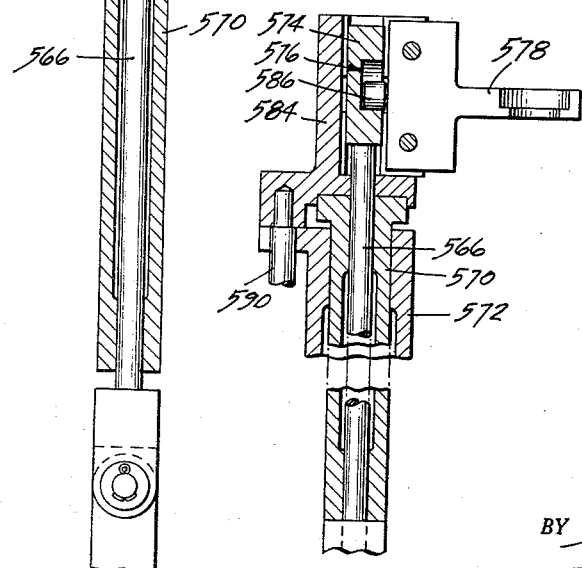

FIGS. 19 and 20 are sections along planes 19—19 and 20—20 respectively, in the direction of the arrows of FIG. 16;

FIG. 21 is a top view of the spring feed mechanism;

FIG. 22 is a sectional view taken along plane 22—22 of FIG. 21, in the direction of the arrows;

FIG. 23 is a front view of the spring feed mechanism, shown in FIG. 22;

FIG. 24 is a front view of the stem feed;

FIG. 25 is a sectional view of the stem feed taken along plane 25—25 of FIG. 24, in the direction of the arrows;

FIG. 26 is a top sectional view taken along plane 26—26 of FIG. 25 in the direction of the arrows;

FIG. 27 is a perspective view of a detail of FIG. 24;

FIG. 28 is a sectional view taken along plane 28—28 of FIG. 24, in the direction of the arrows;

FIG. 29 is a sectional view similar to FIG. 25, showing the parts in a different position;

FIG. 30 is a fragmentary sectional view of the details of the gasket feed mechanism;

FIG. 31 is a top plan view of the stem finger slide assembly;

FIG. 32 is a sectional view of FIG. 31;

FIG. 33 is a sectional view along plane 33—33 of FIG. 32, in the direction of the arrows;

FIG. 34 is a top plan view similar to FIG. 31, showing the parts in a different position;

FIG. 35 is a sectional view along plane 35—35 of FIG. 32, in the direction of the arrows;

FIG. 36 is a side elevation of a portion of the main drive mechanism;

FIG. 37 is a plan view of the mechanism shown in FIG. 36;

FIG. 38 is a plan view of the cup feed assembly;

FIG. 39 is a side elevation of the cup feed assembly shown in FIG. 38;

FIG. 40 is a sectional view along plane 40—40 of FIG. 39, in the direction of the arrows;

FIG. 41 is a sectional view along plane 41—41 of FIG. 39, in the direction of the arrows;

FIG. 42 is a sectional view of the index lock housing assembly;

FIG. 43 is a sectional view of the mechanism shown in FIG. 42, taken along plane 43—43, in the direction of the arrows;

FIG. 44 is a sectional view of the staking unit mechanism;

FIG. 45 is a top section taken through plane 45—45 of FIG. 44, in the direction of the arrows;

FIG. 46 is a top elevation of the upper portion of a guide mechanism as shown in FIG. 44;

FIG. 47 is a sectional view, substantially the same as the lower portion of FIG. 44, showing the parts in a different position;

FIG. 48 is a fragmentary plan view of a portion of a hi-lo detecting mechanism, including the take-off station;

FIG. 49 is a front elevation, partially broken away, of the actual detecting mechanism shown in FIG. 48;

FIGS. 50 and 51 are schematic wiring diagrams showing the operation of the detecting mechanism;

FIG. 52 is a sectional view along plane 52—52 of FIG. 48 taken in the direction of the arrows;

FIG. 53 is a plan view of the take-off duct shown in FIG. 52;

FIG. 54 is a sectional view of the reset mechanism, taken along plane 54—54 of FIG. 48, in the direction of the arrows;

FIG. 55 is a front elevation of the ejector mechanism;

FIG. 56 is a plan view of the mechanism shown in FIG. 55;

FIG. 57 is a sectional view of the mechanism shown in FIG. 55;

FIG. 58 is a top sectional view taken along plane 58—58 of FIG. 57, in the direction of the arrows;

FIG. 59 is a sectional view taken along plane 59—59 of FIG. 58 in the direction of the arrows;

FIG. 60 is a partial, sectional view, similar to FIG. 57, showing the parts in a different position;

FIG. 61 is a sectional view taken through the machine along plane 61—61, in the direction of the arrows, as shown in FIG. 63;

FIG. 62 is a top elevation taken along the plane 62—62 of FIG. 61, in the direction of the arrows; and FIG. 63 is a top view of the machine.

Figure 2:
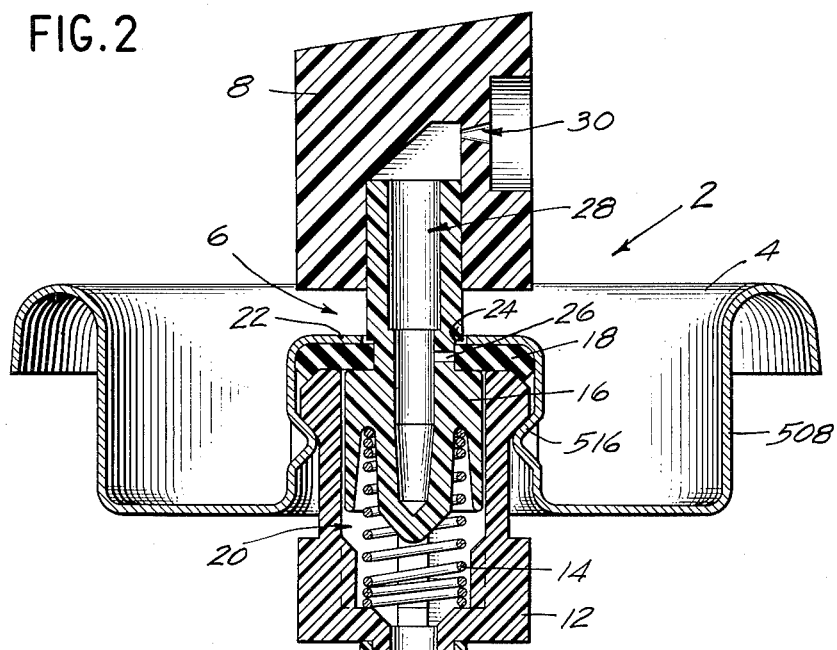
FIG. 2 is a sectional view of the components of an aerosol valve.
Figure 3:
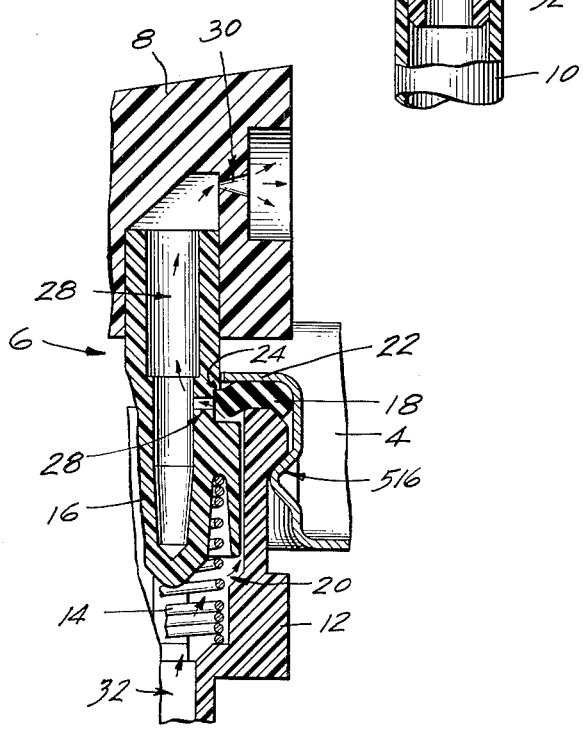
FIG. 3 is a broken away view of a portion of the aerosol valve.
Figure 17:
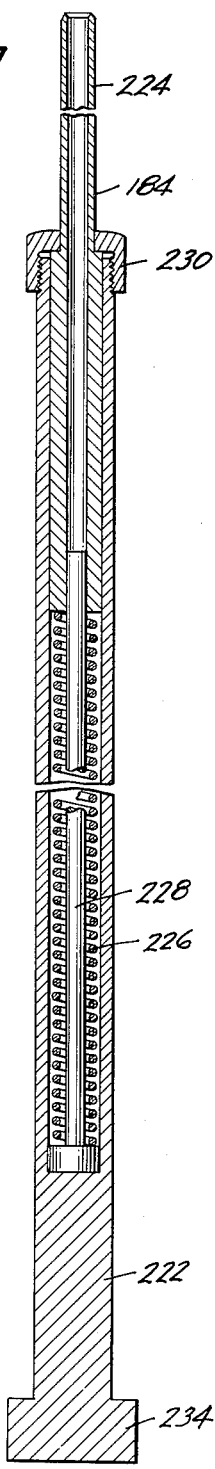
FIG. 17 is an enlarged sectional view of a tube feed index spindle shown in FIG. 16.

With reference to the drawings and particularly FIGS. 2 and 3, the aerosol valve 2 is shown as comprising a valve cap or crown cup 4, which supports a valve assembly 6, which is equipped at one end with a push button 8, and at the other end with a feed tube 10.

The valve assembly 6 comprises a body 12, a spring 14, a stem 16, and a gasket 18. Basically the body 12 is equipped with a central bore 20, which houses stem 16, which in turn is biased to one axial extremity of the bore by the coaxial spring 14. The stem and spring are retained within the aperture 20 by means of the gasket 18, by an inner boss 22 of the crown cup.

As shown in FIG. 3, the parts of the aerosol valve 2 are so assembled that when axial downward pressure is applied to push button 8, the stem 16, which has an annular groove 24 which houses gasket 18 flexes the gasket 18 to expose a radial port 26, which in turn communicates with an axial port 28 within the stem 16. The axial port 28 in turn is continued by a radial opening 30 in the push button 8 which completes a passage. Because of this construction it is obvious that the stem 16, in addition to being in internal relationship with the bore 20 of body 12, is spaced from the latter far enough to permit of a free passageway to the radial port 26. Further, the body 12 has an axial passageway 32, which communicates with the tube 10, whereupon when button 8 is depressed a passageway is available through tube 10, through body 12, around stem 16, to the radial port 26, through the axial port 28 and out the radial opening 30.

Figure 1:
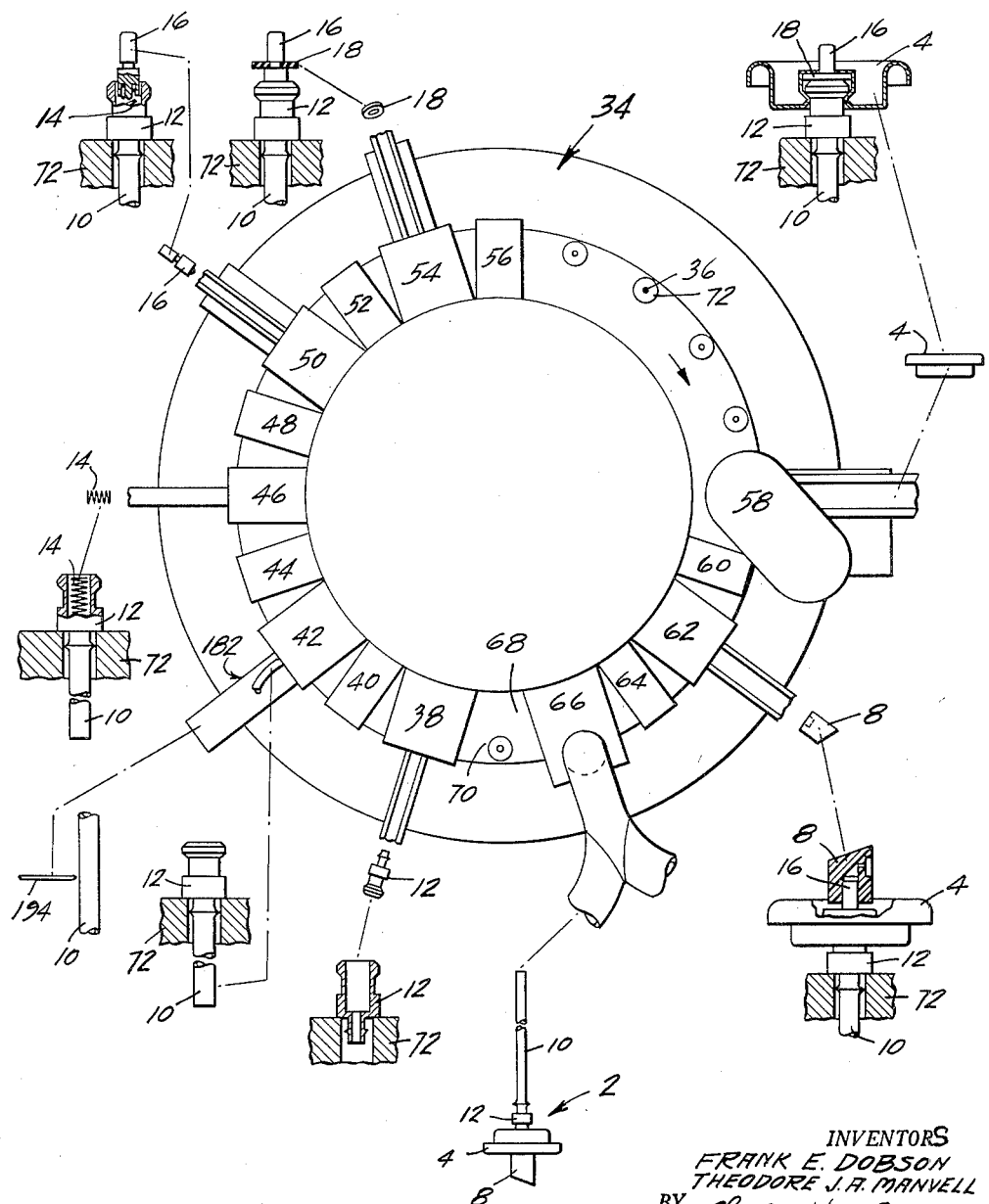
FIG. 1 is a schematic plan view showing an embodiment of the instant invention.

The problem of this invention is to provide mechanism for assembling the valve above described. In this regard reference is made to FIG. 1, which shows the operating stages of assembly. It will be understood that the parts are supplied in sequence, and each time a part is added, a check or test is made to determine whether or not the part was correctly assembled.

Briefly, the assembly mechanism comprises; a multistation dial 34, which is rotated by some index mechanism, which does not form a part of this invention, in such a manner that the dial rotates and stops sequentially in a manner that any point on the dial is moved circumferentially to a number of stations, which in turn are used for assembly of parts of the valve.

In a preferred or exemplary embodiment, the dial is equipped with twenty pockets 36, and each pocket is moved sequentially past a body station 38, a body detector 40; tube feed station 42; tube feed detector 44; spring feed 46, spring feed detector 48; stem feed 50, stem feed detector 52; gasket feed 54, gasket feed detector 56, to a crown cup feed and stake station 58, high-low detector 60, push button feed 62, push button detector 64, take-off station 66, take-off detector 68, and finally to the pocket cleaning station 70.

As a premise to this discussion, it will be appreciated that the pockets 36 in the dial 34 have axes disposed transverse to the plane of the dial. In this regard the pockets can either be shaped right in the dial 34, to accommodate a body 12, or as in a preferred instance, an adapter or holder 72, is mounted in the dial, which adapter 72 is equipped with an axial opening which is contoured to accommodate the body 12, with leeway for the application of the tube 10.

To recapitulate, the dial pockets are moved from station-to-station in such a manner that first the body 12 is fed to the pocket, then the tube 10 is assembled on the body, a spring 14 is fed into the central bore 20, followed by a stem 16, which is positioned coaxially with the body and the spring, after which the gasket 18 is placed in position on the stem, followed by a crown cup also mounted coaxially of the valve assembly to surround the stem and lie on top of the gasket 18, where it is staked into locking contact with the body.

Body station

With regard to the body station, the basic objective is to feed a body with its central bore 20 uppermost until the body overlies a pocket of the dial, and then to feed the body into the pocket 36 in a determined sequence. In this regard, bodies 12 are supplied by some ordinary means to track 74 (FIG. 7) which in turn conducts them seriatim to a cross-feed 76 and thence to jaws 78, from which they are fed to the pockets.

It will be recognized then that two basic movements are necessary at the body feed station 38, namely, the cross-feed and the plunger feed. Both of these movements are controlled by a continually rotating drive shaft 80 (FIG. 5) in the following manner:

Cross feed

Figure 7:
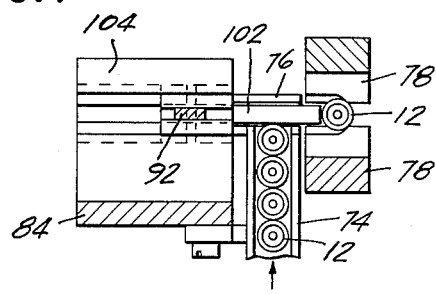
FIG. 7 is a sectional view taken along plane 7—7 of FIG. 4 in the direction of the arrows.
Figure 8:
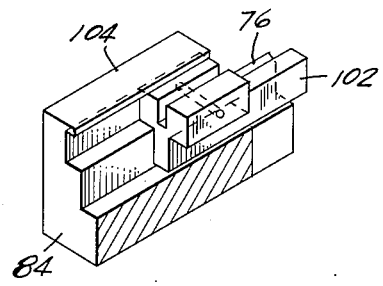
FIG. 8 is a perspective view showing a detail of FIG. 7.
Figure 9:
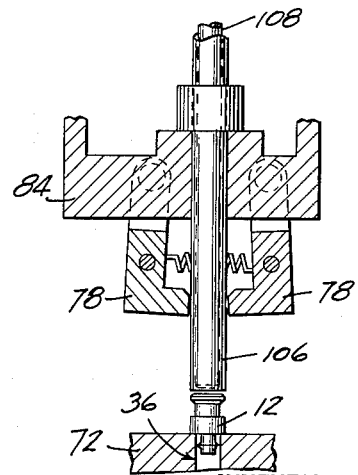
FIG. 9 is a fragmentary sectional view of the parts shown in FIG. 5, showing parts in different position.
Figure 18:
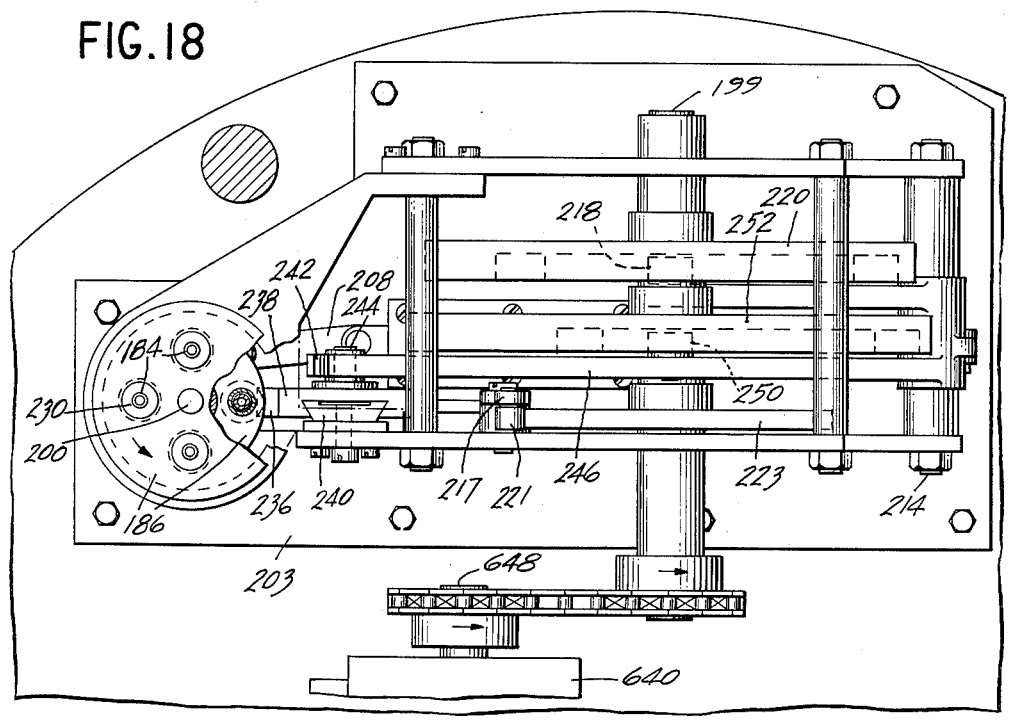
FIG. 18 is a front elevation of the lower drive portion of the tube feed mechanism shown in FIG. 16.

Drive shaft 80 is supported in a bearing 82, carried by the feed structure 84 and is equipped at one end with a cam 86, which in turn carries a crank pin 88. A lever mechanism 90 (FIG. 4) is positioned to be operatively associated with cam 86 to control the cross-feed. Specifically, a cross slide lever 92 is pinned, or otherwise secured, to a cam roller lever 94, and both levers in turn are pivotally supported by some spindle means 96, which is carried by the body feed structure 84. The cam roller lever 94 in turn carries a roller 98, which is operatively associated with cam 86 and is held in contact therewith with a spring 100. With this operating mechanism, as the cam 86 rotates through 360° the roller lever is reciprocated, as viewed in FIG. 4, by the cam 86, and in turn carries the cross slide lever 92. The latter has secured to it at its end, remote from pivot 96, a cross slide 102 (FIGS. 4 and 7). Cross slide 102 is supported for reciprocal movement in a grooved block 104. With this structure, as the cross slide is at one extreme of its reciprocal sliding movement, a body is fed into the path of the cross slide and then the body is moved as the cross slide moves towards the other extreme of the reciprocal movement into the retaining jaws 78. The latter in turn are spring biased together to provide releasable frictional engagement for the body 12.

Vertical plunger feed

The vertical plunger feed comprises a stripper tube 106 (FIG. 5) and casing on feed plunger 108, with the combination being mounted for reciprocal movement in guide bushings 110, 112 carried by body feed structure 84. Actually the feed plunger 108 is biased to one axial limit of travel relative to the stripper tube 106. The limits of the axial movement is controlled by a pin 116 which passes through the center of feed plunger 108 and through slots in the walls of stripper tube 106. The slots define the limits of axial travel.

The stripper tube plunger combination is connected to the crank pin 88 by means of a connecting rod 118 and bearing pin adapter 120. With this structure it is obvious that as crank pin 88 is rotated with cam 86, the connecting rod 118 and bearing pin adapter 120 will propel the stripper tube 106 and plunger 108 assembly through its predetermined reciprocal travel. This travel is such that on the downward leg the plunger 108 will engage the central bore 20 of body 12 and force it through the jaws 78 and into the dial pocket 36. It is obvious that the timing of the cross-feed movement and the plunger movement is such that the cross-feed will supply a body to the jaws 78 at a time when the plunger is approaching the opposite limit of its reciprocal movement.

*Body detector 40*

As a premise to this discussion, it should be pointed out that the detector stations, later described, are positioned to overlie index points of the pockets located in the dial 34, and accordingly, while detector stations, 40—body detector, 44—tube feed detector 48—spring feed detector, 52—stem feed detector, 56—gasket feed detector, 60—hi-lo detector, 66—take-off station, 68—take-off detector, have been mentioned, it should be understood that the operating mechanism for each of the detector stations is substantially identical, with the exception that a different adapter is provided for each detector station, depending upon the conditions to be met at the detector station. Accordingly, this description for the body detector station will apply to all of the other detector stations.

With regard to the body detector station, a basic operating means is supplied by means of a continuous rotating shaft 122 (FIGS. 10 and 11) which is carried by bushings 124, supported by the body detector station structure. The shaft 122 carries at one end a crank 128, which includes a crank pin 130, which cooperates with a slot 132 in a slide body 134. With this conventional mechanism the rotation of the shaft 122 then reciprocates the slide body 134. The slide body 134 in turn is supported by suitable interlocking guide means or gibes 136. A detector tube 138 is supported in bushings 140 carried by slide body 134 for movement relative thereto. The tube 138 is biased by gravity or suitable spring means (not shown) if necessary, to one limit of its slidable movement relative to the slide body 134. The limit of this slidable movement is controlled by a collar 142, which is secured to the detector tube 138 and which will ride on the surface of the upper bushing 140 of the slide body 134. The detector tube 138 also carries an adjustable collar 144, which is positioned to cooperate with an operating arm of a micro switch 146. With this structure it will be recognized that the detector tube 138 normally being at one limit of its slidable movement will be carried by the body slide 134 as the latter is driven by the crank 128 in a manner to operate the micro switch 146. If a body 12, however, is properly positioned in the pocket that underlies the body detector 40, then the detector tube 138 will be moved relative to the body slide 134 so as not to operate the micro switch 146.

The micro switch 146 is connected in any suitable manner to the main drive mechanism of the machine and which upon being operated stops the machine and thus arrests the movement of the holders 72.

While the detector mechanism just described is operable to detect conditions, it could happen that in a detector operation the detector tube would pick up the parts that it was detecting. To prevent this possibility, the detector tube 138 is equipped with an air hose 148, which supplies a continuous flow of air to obviate this possibility.

*Tube feed unit*

The objective of the tube feed unit 42 (FIGS. 12, 13, 14, 15) is to mount a feed tube 10 on the lower end of a body 12 and the mounting is accomplished in the following manner: Specifically, a supply of flexible hollow tubing, such as polyethylene, is supported on some conventional roller in alignment with the tube feed station. The tube feed station, similarly to the other feed stations, is operated by a continuously driven shaft 150 which rotates in bearings 152 carried by the tube feed structure 154. The shaft 150 carries cams 156 and 158 which control the amount of tubing which is to be fed in subsequent operation and a tube feed drive gear 160. With reference to FIG. 13, a continuous length of tubing 162 is shown being supplied to the tube feed structure 154, which in turn carry a guide roller 164, a main drive roller or wheel 166 and a contact roller or wheel 168. The guide roller 164 is mounted for free rotation while the guide roller 166 is driven by the drive gear 160 through some suitable drive train.

In order to establish the driving relationship for the main drive roller 166, the contact roller 168 is mounted on an arm 170 by a pin 171, which is pivotally supported on the tube feed structure 154 and is biased by a spring 172 for frictional engagement with the main drive roller 166. With this drive mechanism, tubing will be supplied in response to the rotation of the shaft 150.

It is obvious, however, that a control means must be supplied for regulating the amount of tubing that is fed in a cycle of operation. This control mechanism comprises: A cam 156 acting in conjunction with a cam roller lever 174, which in turn is mounted on pin 171 for rotation in conjunction with the rotation of arm 170. It follows that under the influence of spring 172 the cam roller lever 174 is biased into engagement with the cam 156, but by operation of the cam at high dwell point the cam roller lever 174 will be rocked clockwise as viewed in FIG. 13, to rotate pin 171 and hence arm 170 to disengage the contact roller or wheel 168 from the main drive roller 166, and hence interrupt the driving of the tubing 162.

The tubing as it leaves the main drive wheel 166 is fed through a nozzle 176 into a tube 178, which is supported at one end by bracket 180 and at the other end it is connected to a portion of a knife assembly 182. The tubing as it passes through the guide tube 178 is fed into a feed tube nozzle 184, which is carried by a dial plate 186 (FIG. 16).

In order to mount a tube on the lower end of a body, it is necessary to cut off the tube after it has entered the feed tube nozzle 184, then index the nozzle to a position where it will underlie the body when the latter is at the index station of the feed tube station and while the parts are in this relative position the tube is mounted on the body.

These operations are accomplished as follows:

*Tube cutoff*

The tube cutoff comprises knife assembly 182 (FIG. 12), a solenoid operated air valve 188, a control switch 190 (FIGS. 13 and 15) for operating the solenoid air valve 188. The knife assembly 182 comprises a supporting structure 192 and a knife 194 which is mounted for reciprocal movement in the structure 192 by an air cylinder 198. Specifically, when the solenoid is energized the air valve 188 is operated which moves a piston rod 196 to the left as viewed in FIG. 12 to push knife 194 across the path of tubing 162. The solenoid valve 188 in turn is energized by the micro switch 190, which in turn is operated by the cam roller lever 174. Specifically, when the cam roller lever 174 is rocked clockwise in response to the high dwell of the cam 156, the contact roller or wheel 168 is disengaged from the main feed roller or wheel 166 and simultaneously the micro switch 190 is operated. The switch 190 is operated through a cam 191 formed on the lever 174. (It will be understood that tubing was first hand fed down to contact with knife 194 before an automatic operation was started.) As the micro switch 190 is operated the tube is cut off as above described.

Index mechanism

The index mechanism is under control of a continually rotating drive shaft 199 (FIG. 16) which is equipped with a plurality of cams that regulate (*a*) the index mechanism and (*b*) index lock and the vertical throw of the feed tube nozzle 184.

Dial plate assembly 186 (FIGS. 16, 17, 18, 19, 20) carries a central shaft 200, which is supported for rotation by a bearing 202 which is connected to a base plate 204. The shaft 200 carries a ratchet mechanism 204 which includes a pawl 208. The latter is cyclically operated by a pawl arm 210, which is connected to a crank arm 212, the latter being pivotally supported by some pin means 214. The crank arm 212 is biased by a spring 216 to one limit of the cyclic position of the pawl 208. The crank arm 212 carries at its opposite end a roller 218, which is positioned with engagement with an indexing cam 220, which as mentioned before is driven by shaft 199. In cyclic operation then as shaft 199 goes through one revolution, cam 220 will follow with it to reciprocate the crank arm through one cycle, which in turn will cause pawl 208 to be released and then reengage with the ball mechanism 204. This operation permits an index position of the dial plate 186 to rotate 90°. Therefore, the tubing is fed into its feed tube nozzle 184 two cycles before it is fed out and mounted on the lower end of the valve body.

Vertical feed

Before describing the vertical feed, it is necessary to describe the structure of the feed tube nozzle assembly 184. Specifically, the feed tube nozzle assembly 184 comprises a guide tube 222 (FIG. 17) which encircles a feed tube nozzle 224 and encases a spring 226 and stop rod 228, (all elements being coaxially assembled). The stop rod 228 is mounted within the guide tube 222 and then the spring 226 is positioned concentrically around the stop rod 228. Then the feed tube nozzle 224 is pushed into the guide tube 222 to abut the spring 226 and to cause the stop rod 228 to enter the center bore of nozzle 224. The nozzle 224 is held into the guide tube 228 by retaining nut 230, completing the assembly. With this structure it is obvious that the tube is fed into the center bore of 224 until it hits the stop rod 228.

When the nozzle assembly has been indexed to the position where it is to be fed onto the lower end of the valve body 12, then if the guide tube assembly is raised the feed tube nozzle 224 will engage the bottom of the pocket 36 in the main dial plate 34 to interrupt the movement of the feed tube nozzle 224 so that when the further movement of the guide tube 222 causes stop rod 228 to push on the tubing which is within the feed tube nozzle 224 to move it into operating contact through the pocket on the dial and into engagement with the lower end of the valve body 12. Upon reverse movement of the guide tube 222, the feed tube nozzle 224 reverts to its original position relative to the assembly, leaving the tube 10 firmly attached to the lower part of the body 12.

To control the vertical movement of the guide tube assembly 222, the arrangement of its control mechanism is such that when in the index position where the assembly will feed the tube onto the bottom of the body portion of the valve, the lower end 234 of the guide tube assembly 222 will be in operative engagement with an adjusting screw 236 (FIG. 16) which is carried by the slide plate 238. The latter is mounted for vertical sliding movement on a slide 240. Slide plate 238 carries a block 242 which is free to rotate on pin 244. The block 242 is positioned within the jaws of a lever 246, which in turn is pivotally supported by a pin 214, which is carried on the tube assembly structure. The lever 246 carries a roller 250, which is operably engageable with a cam 252, which is mounted on a continuously rotating shaft 198. With this structure, the rotation of the cam 252 will control the cyclic raising and lowering of the guide tubing assembly 222 when the latter has been indexed to a proper feeding condition.

Incidentally, the movement of the index plate 186 is locked at each index position by a suitable cam controlled locking mechanism 213 (FIG. 20). Specifically, a lock rod 215 is slidably mounted in the tube feed structure, and is engageable with a crank arm 217 (FIG. 16), which is pivotally supported by a pin 219 and carries at its opposite end roller 221 which is engageable with lock control cam 223. With this arrangement rotation of the cam 223 the lock rod 215 is pushed into engagement with a suitable lock plate 225 which is affixed to the shaft 200.

Spring feed station 46

Spring feed station 46 is operable under control of a continuously operating drive shaft 254 (FIGS. 21, 22, 23) which is supported by suitable bearings 256 in the spring feed housing 258. The shaft 254 carries a crank 260, including a crank pin 262. The latter is engageable with a slide 264 to effect conventional reciprocal movement thereof. Slide 264 is mounted in guideways 266, 268 and carries at its lower end a pivot pin 270. A link 272 connects the pivot pin 270 with a pawl carrier 274. Pawl carrier 274 is mounted for rocking movement about shaft 276 and carries a pawl 278, which is spring biased into engagement with a ratchet wheel 280 supported on shaft 276. Shaft 276 also carries gear 282, one on either side of the pawl carrier 274.

Gear 282 is meshed with a driven pinion 284 mounted on shaft 286 which is supported by the spring gear frame work housing 258.

The shaft 286 carries a spring feed index wheel 288, which in the illustrated embodiment has 4 pockets 290, equally spaced 90° apart.

Feed wheel 288, as viewed in FIG. 23 has as an integral part thereof an axially detent wheel 292. The latter has 4 equally spaced detents 294, which are engaged by the spring loaded ball 296. While the ball and detent is shown displaced from the pockets, it is obvious that the relative position of the detent mechanism and the pockets has no bearing on the invention. The ball and spring mechanism is carried by a shroud which encompasses a substantial part of both the feed wheel 288 and the detent wheel 294. As shown in FIG. 22, the shroud exposes enough of the feed wheel 288 to permit a spring 14 to be inserted in a pocket 290, which would be located at 3 o'clock, which spring would be encased within a shroud while the feed wheel 288 is moved counterclockwise to 6 o'clock position, at which time the spring would be free to drop into a body 12 located in the dial pocket 36.

Springs 14 are fed to the spring feed wheel 288 along a spring feed tube 298, which is supported on the spring feed housing 258 and which carries a supply of springs 14 which are fed by gravity or by a vibrator or by some other suitable feed source to the spring feed wheel 288.

By means of the mechanism described, the spring feed wheel 288 is driven as follows: At each revolution of the shaft 254 from the position shown in FIG. 22, through the first 180°, the slide 264 moves down to rock the pawl carrier 274 about shaft 276 thereby displacing pawl 278 counterclockwise over the next tooth of the ratchet wheel 280. Upon the reverse stroke of the slide plate 264, as driven when shaft 254 makes the second half revolution, the pawl carrier 274 rocks clockwise so that pawl 278 will drive ratchet wheel 280 through one tooth range. The ratchet wheel 288, since it is connected to shaft 276 drives the gear 282, which has a suitable gear ratio relative to the pinion 284 to drive the shaft 286 and hence the spring feed wheel 288 through 90°.

In order to arrange suitable timing of location of the spring 14 over a pocket 12, it has been found desirable to insert a spring in the feed wheel 288 three cycles before the time that it is dropped into the body 12, but obviously any other similar arrangement could be used.

With this mechanism, and with the drive shaft 254 timed to the operation of the pocket 36 of the dial 34, a spring 14 is dropped into a body 12 each time that a dial pocket 36 is stopped in spring receiving position under the spring feed station 46.

Stem feed station 50

The stem feed station 50 is substantially identical to the mechanism used for the body feed station 38 and accordingly, it is felt that a brief summary of operation will be satisfactory. Specifically, the stem feed station is under control of a continuously rotating shaft 300 (FIGS. 24, 25, 26) which is supported in a bearing 302, carried by the stem feed structure 304. The shaft 300 carries a crank and cam wheel 306 including crank pin 308 which oscillates a connecting rod 310. The connecting rod 310, through suitable connecting mechanism oscillates stripper rod 312.

The cam wheel 306 is formed integrally with an edge cam 313 which through suitable connecting mechanism, shown generally as lever 314, reciprocates cross slide 316 (see also FIG. 27) to feed a stem into stem feed position 318 which is defined by the spring biased jaws 320.

The stems are supplied to the cross slide by some suitable gravity or vibrating feed mechanism, so that for each cycle of operation a stem is fed into the spring loaded jaws 320 at the feed station 318 in substantially identical manner as the body is fed into the jaws 78), whereupon the stripper rod 312, carrying the stem holder 322 moves down to pick up a stem 16 and forces it through the jaws 320. Assuming that a body 12 has been moved by the index plate 34 into indexing position with the stem feed, then the stem holder 322 will have fed the stem into concentric engagement with a spring 14 and body 12. The mechanism is arranged so that a stop 324 on the stem holder 322 will engage a suitable stop plate 326 located on the frame work, whereupon the further downward movement of the stripper rod 312 will extend through the stem holder 322 to strip the stem from the stem holder and complete the concentric assembly of the stem with the spring 14 and body 12.

Washer feed station 54

The gasket feed mechanism 54 is substantially identical to that of both the body feed mechanism 38 and the stem feed mechanism 50, with the single exception of the pick-up and stripping mechanism 328 which, incidentally, is driven in exactly the same manner as the stripper rod 312 in the stem feed mechanism.

In loading a gasket 18 onto a stem 16 which has been indexed to gasket feed position 54, the pickup and stripping mechanism 328 is moved vertically downward with the guide pin 330 moving into the axial port 28 of the stem 16 to serve as a guide mechanism, whereupon the stripper 332 will move the gasket 18 from jaws 334 (which jaws operate substantially identical to those shown for the body feed mechanism) down into concentric engagement with the stem 16 and force it axially downward into the annular groove 24 of the stem.

The relationship of the guide pin 330 and stripping mechanism 332 may be controlled by any conventional mechanism for permitting relative motion, but in the illustrated embodiment, the guide pin 330 carries a ball 336 which is wedged against the stripper 332 which has a chamfer 338. The ball 336 also rests against a coaxial stop rod 340 which is adjustably supported on the gasket feed structure and positioned within the guide pin 330.

The stop rod 340 has a reduced annular section 342 and accordingly, when pickup and strip mechanism 328 moves vertically downwardly, the chamfer 338, acting in conjunction with the stop rod 340, effect a driving relation of the guide pin 330 until such time as the ball 336 can enter the guide pin and engage the annular section 342, at which time the ball is disengaged from the chamfer 338 and the driving relationship ceases. The guide pin 330 also carries a stop nut 344 which engages a shoulder 346 on the stop rod 340 to limit the downward movement of the guide pin 330. The stripper 332, however, continues down for the full extent of the crank control movement to position the gasket 18 into the annular groove 24 of the stem 16.

Centering finger assembly

While it is not a necessary element of this invention, it has been found that providing a centering finger assembly 348 (FIG. 29), at both the stem feed station 50, and the gasket feed station 54 insurance is given to the proper concentric alignment of the elements of the valve assembly.

One embodiment of this centering finger assembly 348 is shown in FIGS. 31 through 35, as comprising continuous rotating drive shaft 350, supported in a bearing 352, carried by a support structure 354 of the centering finger assembly 348. The shaft 350 carries at one end a cam 356, which is operably associated with a cam follower 358, which is attached to a slide 360. The slide 360 in turn is supported in suitable guides 362, formed as a part of the centering finger structure 364, in turn supported by the support structure 354. A link 366 is pivotally connected to both the slide 360 and operating lever 368. The latter is pivotally supported by the structure 364 and is spring biased by a spring 370 into a rest position. The operating lever 368 carries at its opposite end a link 372 which pivotally connects the lever 368 and a slide assembly 374. As shown in FIG. 31, slide assembly 374 comprises an outer slide member 376 and an inner coaxial slide member 378. The two slide members are biased apart by the springs 380. The outer slide member 376 carries a pair of pivot pins 382 which provide an operating force for a pair of centering fingers 384 via a pair of associated connecting links 386.

Centering finger structure 364 also carries a stop bar 388 which provides for relative axial movement between the inner and outer slide members 376 and 378. Specifically, as the link 372 pushes on the outer slide members 376, a force is applied via the springs 380 to the inner slide member 378 so that the two members move together towards the left, as viewed in FIG. 31. This movement is continued until a stop plate 390, which is carried by the inner slide 378, strikes an adjustable stop pin 392, supported by the stop bar 388. At this point the outer slide 378 will move relative to the inner slide 376 and compress the springs 380.

The inner slide 378 also carries a pair of pivot pins 394, which pivotally support the centering fingers 384, and accordingly, when the inner slide 378 stops, the outer slide 376 will move the pivot pins 382 and act through the links 386 to rock the centering fingers 384 from the open position shown in FIG. 34 into the FIG. 31 position. The fingers in the FIG. 31 position will act as a centering medium between the stem and the body at the stem feed station 50, and as a stem centering medium at the gasket feed station 54. It is a fact that at the gasket feed station 54 the thickness of the centering fingers 384 would be modified and the size of the aperture 396 would be changed to accommodate the thickness of the stem.

At the gasket feed station 54, the timing of the operation of the centering fingers 384 is such that the centering fingers start to separate, as later described, at the instant the guide pin 330, FIG. 30, enters the center of the stem.

In order to release the centering fingers 384, the cam 356 in continuing its rotation permits the spring 370 to pull on the lever 368 to move the link 372 to the right, as viewed in FIGS. 31 and 32. The movement of the link 372 to the right will pull the outer slide member 376, thereby permitting the springs 380 to expand back to their FIG. 34 position, at which time the top portion of slide member 376 engages against the stop plate 390 and thereby the inner slide member 378 is picked up by the outer slide member 376, so that the slide assembly 374 moves back to its rest position, shown in FIG. 34. As the outer slide member 376 moves relative to the inner slide member 378 of the pivot pins 382, acting again through the links 386, will rock the centering fingers 384 to their FIG. 34 position.

*Crown cup feed and staking assembly*

Before describing the crown cup feed and staking assembly station 58, it seems advisable to set the perspective for the description by indicating that at this station two distinct operations take place, namely, the crown cup 4 is first fed into coaxial alignment with the other elements of the valve mechanism, and then it is moved axially into assembled relation with the other valve elements, whereupon the assembly is staked together. In describing this mechanism, therefore, the two individual operations will be treated separately except for the fact that both are under control of a single continuously driven shaft 398, FIG. 36.

*Crown cup feed*

The crown cup feed 400, as shown in FIG. 37, is operatively associated with the shaft 398 and is positioned adjacent the crown cup feed and staking station 58. The crown cup feed 400 comprises an interconnected main feed track 402, a supply track 404, and suitable driving mechanism for urging the crown cups along the main feed track 402 into the crown cup and stake station 58. In this respect, crown cups are supplied by gravity or by some vibrating force along the supply track 404 to the main track 402, whereupon their direction is changed under control of a slide 406 (see also FIGS. 38, 39, 41) which is oscillated along the axis of the main track 402 under control of a cam 408, secured to the drive shaft 398. Specifically, the cam 408 engages a cam roller 410 (FIG. 38), carried by a cam lever 412, which in turn is supported on a shaft 414, which is pivotally supported in an index lock housing 416 (FIGS. 36 and 42). Shaft 414 carries at its upper extremity (FIG. 42 and FIG. 38), a slide operating lever 418, which oscillates the slide 406 via the adjustable link 420. Specifically, in each revolution of the shaft 398, the cam 408 will rock the cam roller lever 412 clockwise (in opposition to the return spring 422), thereby moving slide operating lever 418 to its right hand limit. As the cam 408 moves away from the roller 410, the spring 422 will retract the slide roller lever 418 and thereby pull the slide 406 to the left, as viewed in FIG. 38, to drive a crown cup into the crown cup station 58. On the reverse stroke of the slide operating lever 418, a crown cup is fed into the main feed track 402.

At the crown cup station 58, the main feed track 402 is equipped with a drag link 424 (FIGS. 38 and 39) which serves simply to provide a dragging effect on the crown cups. The link 424 has a protuberance which lies in the path of feed of the crown cups, and the link 424 is pivotally supported on a shaft 426, which in turn is carried by the main feed track 402. The drag link 424 is biased into its FIG. 38 position by a torsion spring 428.

Before describing the assembly of the crown cup onto the valve elements, it will be pointed out that in order to insure alignment of the valve stem with the aperture of the crown cup, a pair of centering fingers 430 (FIGS. 38, 39 and 40) are positioned at the crown cup feed and staking station 58. These centering fingers 430, as shown in FIG. 40, are under control of a gear sector 432. Actually, each of the centering fingers 430, which are pivotally supported on pins 434, carry pinion gears 436 which are meshed with one another and one of the pinion gears is meshed with the sector 432. The sector 432 is pivotally supported on a pivot pin 438, carried by the main feed track 402, and in addition has an operating pin 440, which is driven by a slide mechanism 442 (FIGS. 40, 42, 43). The latter has a cam roller 444 operably connected with a cam 446, mounted on the drive shaft 398.

With this mechanism it can be seen that in each revolution of shaft 398, cam 446 will move the slide mechanism 442 to rock the sector 432, thereby rotating the pinion gears 436 to close the guide centering fingers 430. The latter will stay closed until the low portion of the cam 446 is in engagement with the roller 444, whereupon the fingers will snap open. This is timed so that the fingers are clear of a down coming crown cup, which will later be described.

*Cup assembly and staking mechanism*

In order to coordinate the relative positions of the crown cup and the staking mechanism 450, at the instant the crown cup is fed into the crown cup feed and staking station 58, reference is made to FIG. 44 wherein a crown cup 4 is shown positioned in a pair of track jaws 452 (see also FIG. 46), which are so arranged as to form a continuous portion of the main feed track 402. The function of the jaws 452 is to support the crown cup 4 in coaxial alignment with the other elements of the valve assembly until it is picked up by the staking jaws 454. It is the function of the staking jaws, the operation of which will later be described, to engage a crown cup 4 and hold it as the crown cup is moved into assembled position with the other elements of the valve assembly and then to crimp the crown cup into assembled relation with the other components.

In order to accomplish this objective, the track jaws 452 are pivotally supported by pins 456 (FIG. 47), carried by adjustable brackets 458, supported on the staking mechanism 450. The jaws 452 carry camming surfaces 460, which are positioned in the path of the staking jaw holder 462, which, as later described, is movable relative to the jaws 452. As the jaw holder 462 moves towards the FIG. 47 position, it will strike the camming surfaces 460 and rock the jaws 452 to their FIG. 47 position clear of cup 4.

The operation of the staking jaws 454, as previously mentioned, is under control of the main drive shaft 398, which is gear connected to a stub shaft 464 that is supported for rotation in the staking assembly 450. The stud shaft 464 carries a crank 466 and a crank pin 468. The crank pin 468, in turn is connected to the connecting rod 470, which is pivoted on its other end to an inner slide member 472 of the staking assembly 450. The inner slide member 472 is provided with an internal threaded portion 474 at its lower end into which there is positioned a cone end 476, which is locked relative to the inner slide member 472 by the lock nut 478.

The jaw holder 462, previously mentioned, is supported by an outer slide member 480, which is mounted for coaxial movement with and relative to the inner slide member 472, and both the inner slide member 472 and the outer slide member 480 are supported for axial movement relative to a main guide member 482.

The inner slide 472 and the outer slide 480 are axially biased apart by compression spring 484 and are movable together through a portion of their axial travel by means of drive balls 486, which are positioned in holes 488 carried in the outer slide member 480, and in an annular groove 490 in the inner slide member 472. With this structure, as the connecting rod 470 moves the inner slide member 472 axially downward, the ball 486 will drive the outer slide member 480 downward until, owing to the parting load of the compression spring 484 the ball 486 is driven out of engagement from the inner slide member 472 and into an annular groove 492 located in the main guide member 482. At this stage of downward movement of the inner slide 472, the outer slide member 480 will cease its downward travel and the inner slide member 482 is free to continue.

The jaw holder 462 acts as a bearing for a pressure pad 494 to permit axial movement of the pad 494 relative to a suitable guide aperture 496 in the jaw holder 462. The pressure pad 494 extends up into the cone 476 and is biased by a compression spring 498, which is held at one end by key 500 and the spring pad 502. The key 500 extends laterally through a slot in the inner slide member 472 and is positively located in the outer slide member 480. The other end of the spring 498 pushes against the upper end of the pressure pad 494 to bias the latter outwardly into contact with a shoulder 504 in the jaw holder 462. With this mechanism it is obvious that the pressure pad 494 is always under compression as biased by the spring 498. This biased association is used to provide a positive pressure between the crown cup 4 and the body 12 of the valve 2, thereby holding the stem 16, the gasket 18 and the spring 14 in proper position for assembly and to provide squeezing pressure between the crown cup 4, the gasket 18 and the body 12 for correct sealing.

Since the jaw holder 462 is connected to the outer slide member 480, it is a fact that when the connecting rod 470 moves the inner slide member 472 downwardly, the outer slide member 480 as heretofore mentioned, will move downwardly with the inner slide member 472 until the balls 486 drop into annular groove 492 as shown in FIG. 47. This adjustment is such that at this instant the pressure pad 494 is exerting the selected squeezing pressure on the valve assembly.

In order to hold the crown cup 4 in its movement from the track jaws 452 down into assembled relation with the other components of the valve staking jaws 454, there is provided the dual function of supporting the cup on its inner diameter with the back of the jaws 506 engaging the inner surface 508 of the crown cup 4. To accomplish this operation a plurality of staking jaws 454 (in the instant embodiment 4 are used 90° apart—see FIG. 45) are pivotally supported on pins 510, carried by the jaw holder 462 and they are biased to the position shown in FIG. 44 by means of an annular spring 512, so that the upper ends of the jaws 454 contact the peripheral surface of the pressure pad 494. The staking jaws 454 will stay in this relative position and thereby the back of jaws 506 will stay in contact with the inner surface 508 of the crown cup until the cone end 476 (attached to the inner slide member 472) moves relative to the outer slide member 480 (i.e., after the balls have slipped into the annular ring 492) into contact with the ends of the staking jaws 454, rocking them about their pivot pins 510 so that the inner staking teeth 514 are rocked radially inwardly to provide the crimp 516 (one for each staking jaw) in the crown cup, as shown in FIG. 2. The crimp is so profiled and located with respect to the body 12 that it provides a holding force between the body 12 and the crown cup 4 and the gasket 18 sufficient to maintain a suitable seal therebetween.

While it is not necessary, as an operable part of this invention, it is desirable to provide a guide pin 518 to align the stem 16 during the assembly operation. Such a pin 518 is positioned for axial movement relative to the pressure pad 494 and is biased outwardly by a compression spring 520.

Hi-lo detector

The hi-lo detector, which is shown in FIGS. 48 through 54, serves the function of detecting whether or not the valve has been properly assembled, i.e., it picks out any valve wherein the stem 16 is riding either higher or lower than a predetermined level. If the hi-lo detector operates to detect an improper valve then the eject mechanism, later described, will be conditioned to separate such a defective valve from the good valves.

The hi-lo detector, as shown in FIG. 49, comprises a detecting arm 522 and a pair of contacts 524 and 526. Actually, the contact arm is pivotally supported by a pin 528 in the hi-lo switch housing 530 in such a manner that when the arm engages a valve stem 16, which is at the correctly assembled height, the contact 532, carried by the contact or detecting arm 522 will remain between the contacts 524, 526. On the other hand, if the contact arm 522 detects either a low stem 14' or high stem 14" then the contact arm 522 will be pivoted to the extent that the contact 532 will engage conact 526 or 524 respectively. The contact arm 522 is located at the hi-lo detector station 60 (FIG. 1) and is positioned, as shown in FIG. 52, to overlie a valve assembly at the next station after the staking station 58. The circuitry used in connection with the hi-lo detector is shown in FIG. 51. Specifically, a circuit is established from a potential source through the contact 532 of the contact arm 522 and then through contacts 524 or 526 and through conductor 534, through solenoid 536, through cam controlled micro switch 538, back to the potential source. If the contact detector arm 522 is pivoted to establish circuit with either contacts 524, 526, then the solenoid 536 will be energized, causing its plunger 540 to move to the right, as shown in FIG. 51, thereby driving the memory plunger 542 to the right, as shown in FIG. 51, relative to its supporting block 544. Once position has been selected, by means of the solenoid 536, the memory plunger 542, as shown in FIG. 54, will be held in position by means of the spring detent 546, i.e. it has a reject position 548 and a normal position 550. As later explained, the memory plunger 542, once selected for reject will stay in reject position until it operates a reject switch and then at a still later station it will be restored to its normal position 550. If the memory plunger 542 is not operated at the hi-lo station, then it will stay in its normal position so as not to operate the reject switch and the restoring mechanism, also later described, will not operate on it.

It will be recognized that the contact arm 522 between each dial pocket 36 will flip as if it was a low valve stem, therefore, the cam controlled micro switch 538 is employed to energize the circuitry, shown in FIG. 51, only when the contact arm 522 is in position to detect the height of a valve stem. Any conventional cam means can be employed to actuate the switch 538. In the illustrated embodiment, the memory plunger 542, which is employed to close the switch 538 at the time that it is in alignment with the plunger 540 of solenoid 536.

Push button station

In view of the fact that a push button 8 may or may not be considered a part of a completed valve assembly, and in view of the fact that the mechanism for installing the push button, if it is a necessary part, is identical to the body feed mechanism, the mechanism used at the push button station has not been shown or described, and is not considered as a necessary element of this invention.

Furthermore, the detector station 64, which would be positioned to detect the presence of a push button is substantially identical to the detectors shown at the stations 44, 48, 52, etc., and, therefore, the details of the detector at the push button station have not been shown.

Take-off station

The operation of the take-off station 66 is divided into basically three parts, namely, the mechanical lifting of the assembled valve from the dial plate to a position underlying a take-off duct; the application of an air pressure to blow the completed assembled valve through the air duct; and the selection of a path of travel for the vavle, which selection was made concurrently with the mechanical lifting of the valve to its position underlying the take-off duct.

Mechanical lifting

The positive mechanical action of lifting the valve from the dial 34 is employed simply to insure the fact that the valve can be lifted irrespective of any frictional engagement between the valve components and the dial plate.

In this respect the mechanical pick-up 552 comprises (as shown in FIG. 55) a crank mechanism 554, pivotally supported by a pin 556, located on a base plate 558. The crank mechanism 554 is oscillated back and forth under control of a crank arm 560, which is rotated by means of a crank 562 connected to a continuously rotating shaft 564. The crank mechanism 554 drives a control rod 566 vertically through the main structure 568. Actually, the control rod 566 is axially slidable within a main guide tube 570 (FIG. 57) which in turn is slidable within a bearing 572, carried by the structure 568.

At its upper end, the control rod 566, as shown in FIG. 59, carries a cam plate 574, including two inclined slots 576.

As shown in FIG. 58, a pair of pick-up jaws 578 are supported for movement transverse to the axis of control rod 566, i.e., the jaws 578 have bores 580 therein which accommodate a pin 582, carried in a head 584 of the main guide tube 570. The jaws 578 also carry a pair of rollers 586 which extend through the slots 576 in the cam plate 574.

Actually, the cam plate 574 is a lost motion device, which has limited movement relative to the head 584 of the main guide tube 570. Accordingly, as the control rod 566 is raised, the slots 576 act to pull the rollers 586 together, thereby causing the jaws 578 to approach one another. After the lost motion operation between the control rod 566 and the head 584, the cam plate acts to raise the head 584 and accordingly, the main guide tube 570 within the limits of the stroke of the crank mechanism 554.

To insure alignment of the head 584 with the take-off duct 588 (FIG. 55) the head 584 is equipped with a guide rod 590, which slides in a slot 592 (FIG. 57) in the main structure 568.

In operation then, as the crank mechanism 554 starts to move upwardly, the control rod 556 actuates the cam plate 574 and through the lost motion mechanism causes the rollers 586, and accordingly the jaws 578, to approach one another. At this time, the jaws are so positioned that they overlie the take-off point of the take-off station 66 of the dial plate 34. Therefore, as the control rod 566 is raised, it will lift the valve assembly up until it underlies the take-off duct 588. At this point a blast of air is provided through the tube 594 (FIG. 55) which is located in a suitable position to impel the valve assembly through the take-off duct 588.

As shown in FIG. 55, the air supply through tube 594 is controlled by a valve which, in the illustrated embodiment, is controlled by a solenoid 596. The solenoid 596 in turn is energized by a circuit including a micro switch 598, which is operated when the head 584 reaches the eject position underlying the duct 588.

Continuing with the operation of the crank mechanism 554, and with particular attention to its downward stroke, it will be recognized that as the control rod 566 comes down it will first go through its lost motion with respect to the head 584, thereby separating the jaws 578 which will stay apart until they reach the lower limit and the cycle is started over again. The timing is such that the jaws are open when they come down over the assembled valve which is located at the eject station 66 of the dial plate 34.

Defective valve ejection

With respect to FIGS. 52 and 53, the take-off duct 588 is shaped to direct completed tubes into some suitable container, not shown. To take care of a defective valve, the take-off duct 588 is equipped with a take-off branch 500, having a throat 602, which is normally blocked by gate valve 604. The latter is pivotally supported to be rocked from the throat of the branch 600 to a position where it will block the passage of a valve through the take-off portion of the duct 588.

The gate valve 604, in the illustrated embodiment, is actuated by a solenoid 606. The solenoid 606 is in a circuit with a micro switch 608 (see also FIG. 50) which lies in the path of the memory plunger 542, i.e., if the memory plunger has been moved to the eject select position, then the plunger will actuate the micro switch 608 to energize solenoid 606 and switch the gate valve 604 from its position shown in FIG. 53 to block the normal passage of the valve through the take-off duct 588, whereupon the passage of the valve will be out of the eject branch 600.

While it is not a necessary part of this invention, it might be considered desirable to provide a detector mechanism which would lie in the path of the dial plate 34 just after it has passed through the take-off station 66. The purpose of this detector would be to sense whether or not a tube remained in position below the pocket or an assembled valve remained in the pocket and stop the machine accordingly.

Index lock

It has been mentioned that the index plate or dial 34 is moved circumferentially from station-to-station during the assembly of the elements of the valve. It is necessary to positively position the index plate 34 at each of the assembly stations in order to accommodate the assembling mechanisms. In order to do this, an index lock mechanism, as shown in FIGS. 42 and 43, is employed. Actually, the dial plate 34 is equipped with a number of female conical bores 610 equally spaced apart so that there is one for each index position. The index lock mechanism 612 is positioned at the crown cup feed and stake station 58, since there it can provide the dual function of locking the index plate while it supports it against vertical deflection during the staking operation. To accomplish these dual objectives, the index lock mechanism 612 is equipped with a plunger 614 which is slidably supported in the index lock housing 416. The plunger 614 is equipped at one end with a male conical protrusion 616, which is engageable with the female conical bore 610 to align the index plate 34 and support it. The plunger 614 is biased into the locking engagement with the female conical bore 610 by means of a compression spring 618. The plunger 614 is also connected to a lever 620, which is pivotally supported on the shaft 414. The lever 620 has an integral cam roller arm 622, which is operably associated with an index lock cam 624. This cam is arranged so that for a predetermined portion of the cycle the cam roller arm 622 is rocked counter-clockwise under the influence of spring 618, as it drives the plunger 614 into locking position, and then at high dwell position of the cam, the cam roller arm 622 is rocked clockwise to release the plunger 614 from locking engagement with the dial plate 34.

Main and subsidiary drive mechanisms

In the previous discussion, the mechanism at each dial station was under control of a continuously rotating shaft. These shafts could be driven by independent sources so long as they were timed to fit the operation but in one preferred operation the complete timing is controlled by the main drive shaft 398. In this respect, the shaft 398 is equipped with mitre gear 626 (FIG. 6) which drives a matching mitre gear 628, and in turn secured to a shaft 630. Shaft 630 carries a bevel pinion 632 which in turn is in driving engagement with an idler bevel gear 634. The idler bevel gear is supported for free rotation about a shaft 636.

As shown in FIG. 63, the idler bevel gear 634 is in driving engagement with a plurality of driven bevel pinions 638, which in turn drive the continuously rotating shafts for each of the feed and detecting stations, etc.

The dial plate 34, which carries the pockets 36, is supported for rotation relative to an index gear box 640 (FIG. 61). Actually, the dial plate 34 is keyed to a shaft 642 extending from the index gear box 640. The shaft 642 is driven by some suitable mechanism, which in an illustrated embodiment, comprises an inner roller plate 644, driven by a barrel cam 646. The barrel cam 646 is mounted on a continuously rotating shaft 648, which in turn is connected through the pair of mitre gears 650 to the main drive shaft 398. The shaft 648 in turn is driven by a reduction gear 652, which in turn is driven by some suitable driving means 654.

As shown in FIG. 62, the shaft 648 is also driving mechanism for a centering finger drive shaft 656, which in turn, through suitable connecting means, drives the centering finger drive shafts 350.

Drive shaft 648 is also equipped via the driving connection 660 to drive the tube feed shaft 198.

It is obvious that the drive mechanism is simply one method of timing the assembly mechanism to a common source, and that other drive connections could be used and it is not considered within the scope of this invention to explain the details of the driving means.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. An apparatus for assembling aerosol spray valves for containers, comprising a holder for receiving in sequence the individual parts of a said valve, means for moving said holder along a predetermined path and momentarily arresting the same at each of a plurality of sequentially arranged feeding stations adjacent said path for assembling the different parts of said valve, means at a first of said stations operable in response to arrival of the holder thereat for feeding a valve body into said holder, means at a second of said stations operable in response to arrival of the holder thereat for feeding and attaching a tube to one end of said body, means at a third of said stations operable in response to arrival of the holder thereat for feeding a valve spring into the opposite end of said body, means at a fourth of said stations operable in response to arrival of the holder thereat for feeding a valve stem onto said spring, means at a fifth of said stations operable in response to arrival of the holder thereat for feeding a valve washer onto said stem, means at a sixth of said stations operable in response to arrival of the holder thereat for feeding a valve cap onto said stem and over said valve body, and means operated in time with said last-named means for crimping said cap to said valve body after placement thereover to secure together said assembled valve parts as a unitary valve structure.

2. An apparatus of the character defined in claim 1 wherein feeding means are provided at a seventh station operable in response to arrival of the holder thereat for feeding a valve actuating button for assembly onto said stem of said valve structure.

3. An apparatus of the character defined in claim 1 wherein there is provided means in addition to said holder moving means operative in response to the arrival of the holder at each station for locating and temporarily locking said holder thereat to provide for accurate feeding of said valve parts to said holder.

4. An apparatus for assembling aerosol spray valves for containers, comprising a holder for receiving in sequence the individual parts of a said valve, means for moving said holder along a predetermined path and momentarily arresting the same at each of a plurality of sequentially arranged feeding stations adjacent said path for assembling the different parts of said valve, means at a first of said stations operable in response to arrival of the holder thereat for feeding a valve body into said holder, means at a second of said stations operable in response to arrival of the holder thereat for feeding and attaching a tube to one end of said body, means at a third of said stations operable in response to arrival of the holder thereat for feeding a valve spring into the opposite end of said body, means at a fourth of said stations operable in response to arrival of the holder thereat for feeding a valve stem onto said spring, means at a fifth of said stations operable in response to arrival of the holder thereat for feeding a valve washer onto said stem, means at a sixth of said stations operable in response to arrival of the holder thereat for feeding a valve cap onto said stem and over said valve body, at least one detector device disposed adjacent an assembly station to detect the proper feeding of a valve part into said holder before the next following valve part is fed into place, and means connecting said holder moving means with said detector device for arresting the movement of said holder when said detector device detects a valve part missing.

5. An apparatus for assembling aerosol spray valves for containers, comprising a holder for receiving in sequence the individual parts of a said valve, means for moving said holder along a predetermined path and momentarily arresting the same at each of a plurality of sequentially arranged feeding stations adjacent said path for assembling the different parts of said valve, means at a first of said stations operable in response to arrival of the holder thereat for feeding a valve body into said holder, means at a second of said stations operable in response to arrival of the holder thereat for feeding and attaching a tube to one end of said body, means at a third of said stations operable in response to arrival of the holder thereat for feeding a valve spring into the opposite end of said body, means at a fourth of said stations operable in response to arrival of the holder thereat for feeding a valve stem onto said spring, means at a fifth of said stations operable in response to arrival of the holder thereat for feeding a valve washer onto said stem, means at a sixth of said stations operable in response to arrival of the holder thereat for feeding a valve cap onto said stem and over said valve body, means adjacent an assembly station for detecting an improperly assembled valve structure, and a reject device connected with said detecting means for rejecting a said improperly assembled valve structure.

6. An apparatus for assembling aerosol spray valves for containers, comprising a holder for receiving in sequence the individual parts of a said valve, means for moving said holder along a predetermined path and momentarily arresting the same at each of a plurality of sequentially arranged feeding stations adjacent said path for assembling the different parts of said valve, means at a feeding station operable in response to arrival of the holder thereat for feeding a valve part, and means at said station for receiving the valve part from said feeding means and for holding and locating said valve part in alignment with said holder for transfer thereto.

7. An apparatus of the character defined in claim 6 wherein said receiving and holding means are movable jaws and wherein there is provided means for actuating said jaws.

8. An apparatus for assembling aerosol spray valves for containers, comprising a holder for receiving in sequence the individual parts of a said valve, means for moving said holder along a predetermined path and momentarily arresting the same at each of a plurality of sequentially arranged feeding stations adjacent said path for assembling the different parts of said valve, means at a feeding station operable in response to arrival of the holder thereat for feeding a valve part to said holder, said feeding means including a rotatable wheel disposed over the path of travel of said holder and having a peripherally disposed pocket for receiving a valve part, means for conveying said valve part into a position adjacent the periphery of said wheel for pickup by said wheel pocket, and means for rotating said wheel pocket with said valve part contained therein into alignment with said holder for the transfer of said valve part into said holder.

9. An apparatus of the character defined in claim 8 wherein there is provided means for rotating said wheel in time with the movement of said holder.

10. An apparatus of the character defined in claim 8 wherein said valve part is conveyed to said wheel by gravity and wherein there is provided means for guiding a plurality of said valve parts in processional order to said wheel.

11. An apparatus of the character defined in claim 8 wherein there is a shroud encompassing a portion of said wheel for retaining a valve part in a said wheel pocket and wherein a marginal edge portion of said shroud serves to release the valve part to transfer it by gravity from said wheel pocket to said holder.

12. An apparatus of the character defined in claim 8 wherein said means for rotating said wheel comprises an intermittently operable ratchet device connected to said wheel, a reciprocable slide for actuating said ratchet device, and means connecting said slide with said holder moving means for actuating said slide in time with the movement of said holder.

13. An apparatus for assembling aerosol spray valves for containers, comprising a holder for receiving in sequence the individual parts of a said valve, means for moving said holder along a predetermined path and momentarily arresting the same at each of a plurality of sequentially arranged feeding stations adjacent said path for assembling the different parts of said valve, means at a feeding station operable in response to arrival of the holder thereat for feeding a valve part, said feeding means including a track for conveying a plurality of like valve parts in processional order, pusher means disposed at an angle to said track for feeding said valve parts individually from said track into a position adjacent the path of travel of said holder, jaw means in the path of travel of said pusher for receiving and locating a said valve part fed by said pusher, and means for transferring said located valve part from said jaw means to said holder.

14. An apparatus of the character defined in claim 13 wherein said pusher means is a reciprocable slide and wherein there is provided means for actuating said slide in time with the travel of said holder.

15. An apparatus of the character defined in claim 13 wherein said jaw means is a pair of yieldably and hingedly mounted normally closed jaws and wherein there is provided means for spreading said jaws apart to release said valve part for transfer to said holder.

16. An apparatus of the character defined in claim 13 wherein said transfer means is a reciprocably mounted element and wherein said element is provided with means for centralizing said valve part on said element and for retaining said part in said centralized relation during transfer of said part from said jaw means to said holder.

17. An apparatus for assembling aerosol spray valves for containers, comprising a holder for receiving in sequence the individual parts of a said valve, means for moving said holder along a predetermined path and momentarily arresting the same at each of a plurality of sequentially arranged feeding stations adjacent said path for assembling the different parts of said valve, means at a valve assembly station operable in response to arrival of the holder thereat for feeding a valve cap onto said assembled valve parts, means also at said assembly station operated in time with said last named means for crimping said cap to one of said valve parts to secure together said assembled valve parts as a unitary valve structure, gripper jaws disposed adjacent the path of travel of said holder and means for actuating said gripper jaws to grip and remove said assembled unitary valve structure from said holder for discharge from said apparatus.

18. An apparatus of the character defined in claim 17 wherein said gripper jaws are movable relative to each other in one plane and bodily movable together in another plane for gripping and removing said valve structure.

19. An apparatus of the character defined in claim 17 wherein said gripper jaws are laterally disposed slide elements movable toward and away from each other, and wherein there is provided a movable mounting in which said slide elements are carried and wherein said actuating means is a movable push rod attached to said mounting and a stationary cam device disposed adjacent said mounting and engageable by said slide elements.

20. An apparatus of the character defined in claim 17 wherein there is provided a fluid pressure medium ejector device disposed adjacent the path of travel of said jaws for ejecting said assembled valve structure from said jaws.

21. An apparatus for assembling aerosol spray valves for containers, comprising a holder for receiving in sequence the individual parts of a said valve, means for moving said holder along a predetermined path and momentarily arresting the same at each of a plurality of sequentially arranged feeding stations adjacent said path for assembling the different parts of said valve, means at a feeding station operable in response to arrival of the holder thereat for feeding a stem part into assembled position, means at another station disposed in the path of travel of said holder and operable in response to arrival of the holder thereat for securing said assembled valve parts together as a unitary valve structure, and a hi-low detector mechanism located at still another station and in the path of travel of said holder and operable in response to arrival of the holder thereat for detecting the level of the stem in the assembled valve structure.

22. An apparatus of the character defined in claim 21 wherein said hi-low detector mechanism is a movable element located in the path of travel of said stem part and engageable by said stem part and wherein there is provided means responsive to the movement of said element for indicating movement of said element for indicating a stem part at an improper level with respect to said assembled valve structure.

23. An apparatus of the character defined in claim 21 wherein said responsive means includes a movable memory element disposed adjacent and movable with said holder and actuated by said responsive means into a predetermined position for an improperly located stem part, and means located at a subsequent station and operable in response to said actuated memory element for ejecting said improperly assembled valve structure to a place of deposit for such valve structures.

24. An apparatus of the character defined in claim 21 wherein there is provided means mounted adjacent the path of travel of said memory element and disposed at a position after said valve ejection station for resetting said memory element for a subsequent operation.

25. An apparatus for assembling aerosol spray valves for containers, comprising a rotatable dial, a plurality of holders on said dial arranged in equally spaced apart relation adjacent the periphery of said dial for receiving in sequence the individual parts of a said valve, means for rotating said dial and thereby moving a said holder along a predetermined path and momentarily arresting the same at each of a plurality of sequentially arranged feeding stations adjacent said path for assembling the different parts of said valve, means at a valve assembly station operable in response to arrival of the holder thereat for feeding a valve cap onto said assembled valve parts, pressure means also at said assembly station operated in time with said last named means including an axial thrust applied at the periphery of said dial for crimping said cap to one of said valve parts to secure together said assembled valve parts as a unitary valve structure, and holder support means responsive to the arrival of said holder at said station for supplying a supplemental support for said holder during the securing together of said assembled valve parts.

26. An apparatus of the character defined in claim 25 wherein said holder support means is an index lock mechanism mounted adjacent the periphery of said dial and operated in proper timed relation with the operations of the machine for effecting the movement of an index plunger inwardly to engage within a bore provided within each of said holders to support a said holder against vertical deflection during an assembling operation.

References Cited in the file of this patent
UNITED STATES PATENTS

| | | |
|---|---|---|
| 1,712,907 | Stenhouse | May 14, 1929 |
| 1,723,369 | Pew | Aug. 6, 1929 |
| 1,788,601 | Spill | Jan. 13, 1931 |
| 1,948,466 | Broecker | Feb. 20, 1934 |
| 2,007,698 | Tear | July 9, 1935 |
| 2,155,958 | Schmidt | Apr. 25, 1939 |
| 2,255,626 | Ortegren | Sept. 9, 1941 |
| 2,370,828 | Widmont | Mar. 6, 1945 |
| 2,554,982 | Hartley | May 20, 1951 |
| 2,559,369 | Phillips | July 3, 1951 |
| 2,706,847 | Jennings | Apr. 26, 1955 |
| 2,741,291 | Czarnecki | Apr. 10, 1956 |
| 2,761,486 | Reardon | Sept. 4, 1956 |
| 2,781,575 | Kulig | Feb. 19, 1957 |
| 2,781,576 | Jennings | Feb. 19, 1957 |
| 2,800,702 | Abplanalp | July 30, 1957 |
| 2,837,812 | Erdmann | June 10, 1958 |
| 2,850,737 | Walsh | Sept. 9, 1958 |